US010106322B2

(12) United States Patent
Toebes et al.

(10) Patent No.: US 10,106,322 B2
(45) Date of Patent: Oct. 23, 2018

(54) BOT PAYLOAD ALIGNMENT AND SENSING

(71) Applicant: Symbotic, LLC, Wilmington, MA (US)

(72) Inventors: Stephen C. Toebes, Chelmsford, MA (US); Robert Sullivan, Wilmington, MA (US); Forrest Buzan, Dunstable, MA (US)

(73) Assignee: Symbotic, LLC, Wilmington, MA (US)

( * ) Notice: Subject to any disclaimer, the term of this patent is extended or adjusted under 35 U.S.C. 154(b) by 0 days.

(21) Appl. No.: 15/848,153

(22) Filed: Dec. 20, 2017

(65) Prior Publication Data

US 2018/0111755 A1     Apr. 26, 2018

Related U.S. Application Data

(63) Continuation of application No. 15/605,748, filed on May 25, 2017, now Pat. No. 9,862,543, which is a continuation of application No. 14/942,717, filed on Nov. 16, 2015, now Pat. No. 9,676,551, which is a continuation of application No. 13/327,040, filed on Dec. 15, 2011, now Pat. No. 9,187,244.

(60) Provisional application No. 61/423,220, filed on Dec. 15, 2010.

(51) Int. Cl.
   *G06F 7/00*     (2006.01)
   *G06F 19/00*    (2018.01)
   *B65G 1/04*     (2006.01)
   *B25J 9/16*     (2006.01)

(52) U.S. Cl.
   CPC .......... *B65G 1/0492* (2013.01); *B25J 9/1674* (2013.01); *Y10S 901/02* (2013.01); *Y10S 901/09* (2013.01)

(58) Field of Classification Search
   None
   See application file for complete search history.

(56) References Cited

U.S. PATENT DOCUMENTS

| 2,792,234 A | 5/1957 | Page |
| 2,840,248 A | 6/1958 | Grove et al. |
| 2,877,575 A | 3/1959 | Stedt |
| 2,945,604 A | 7/1960 | Kroll |
| 2,996,621 A | 8/1961 | Barrett |
| 3,161,303 A | 12/1964 | Burrows |
| 3,519,149 A | 7/1970 | Saul |
| 3,554,390 A | 1/1971 | Saul |

(Continued)

FOREIGN PATENT DOCUMENTS

| DE | 4104527 | 8/1992 |
| DE | 10142395 | 11/2002 |

(Continued)

OTHER PUBLICATIONS

International Search Report, International Application No. PCT/US2011/065238 dated Mar. 21, 2013.

*Primary Examiner* — Yolanda Rebee Cumbess
(74) *Attorney, Agent, or Firm* — Perman & Green, LLP

(57) ABSTRACT

An autonomous transport robot for transporting a payload, the autonomous transport robot includes a payload bed having at least one reference datum surface and at least one payload justification device, the at least one payload justification device being configured to position a payload on the payload bed in substantial contact with the at least one reference datum surface to place the payload in a predetermined position on the payload bed.

22 Claims, 13 Drawing Sheets

(56) References Cited

U.S. PATENT DOCUMENTS

| | | |
|---|---|---|
| 3,737,056 A | 6/1973 | Hathcock, Jr. |
| 3,738,506 A | 6/1973 | Cornford et al. |
| 3,746,189 A | 7/1973 | Burch et al. |
| 3,802,580 A | 4/1974 | Castaldi |
| 3,876,095 A | 4/1975 | Stedt |
| 3,970,840 A | 7/1976 | De Bruine |
| 3,984,012 A | 10/1976 | Ennis et al. |
| 4,007,843 A | 2/1977 | Lubbers et al. |
| 4,072,203 A | 2/1978 | Pierson |
| 4,079,955 A | 3/1978 | Thorpe et al. |
| 4,219,296 A | 8/1980 | Fujii et al. |
| 4,265,582 A | 5/1981 | Theobald |
| 4,349,938 A | 9/1982 | Fontana |
| 4,372,724 A | 2/1983 | Stolzer |
| 4,406,570 A | 9/1983 | Duncan et al. |
| 4,428,708 A | 1/1984 | Burt |
| 4,459,078 A | 7/1984 | Chiantella et al. |
| 4,470,742 A | 9/1984 | Schindler |
| 4,492,504 A | 1/1985 | Hainsworth |
| 4,505,630 A | 3/1985 | Kaschner et al. |
| 4,538,950 A | 9/1985 | Shiomi et al. |
| 4,678,390 A | 7/1987 | Bonneton et al. |
| 4,679,149 A | 7/1987 | Merz |
| 4,716,530 A | 12/1987 | Ogawa et al. |
| 4,726,725 A | 2/1988 | Baker et al. |
| 4,733,740 A | 3/1988 | Bigowsky et al. |
| 4,773,807 A | 9/1988 | Kroll et al. |
| 4,786,229 A | 11/1988 | Henderson |
| 4,811,229 A | 3/1989 | Wilson |
| 4,812,985 A | 3/1989 | Hambrick et al. |
| 4,856,956 A | 8/1989 | Zur |
| 4,878,876 A | 11/1989 | Ishimoto |
| 4,887,016 A | 12/1989 | Malick |
| 4,966,242 A | 10/1990 | Baillargeon |
| 4,966,513 A | 10/1990 | Motoda |
| 4,993,905 A | 2/1991 | Potocnjak |
| 5,002,449 A | 3/1991 | Kita et al. |
| 5,004,399 A | 4/1991 | Sullivan et al. |
| 5,134,353 A | 7/1992 | Kita et al. |
| 5,134,940 A | 8/1992 | Fujita et al. |
| 5,135,344 A | 8/1992 | Kita et al. |
| 5,149,654 A | 9/1992 | Gross et al. |
| 5,179,329 A | 1/1993 | Nishikawa et al. |
| 5,187,664 A | 2/1993 | Yardley et al. |
| 5,199,840 A | 4/1993 | Castaldi et al. |
| 5,213,463 A | 5/1993 | Rothlisberger |
| 5,218,909 A | 6/1993 | Ng |
| 5,219,264 A | 6/1993 | McClure et al. |
| 5,226,782 A | 7/1993 | Rigling |
| 5,273,392 A | 12/1993 | Bernard et al. |
| 5,286,157 A | 2/1994 | Vainio et al. |
| 5,327,354 A | 7/1994 | Tsujimoto |
| 5,328,316 A | 7/1994 | Hoffmann |
| 5,333,982 A | 8/1994 | Tanizawa |
| 5,333,983 A | 8/1994 | Hatouchi et al. |
| 5,362,197 A | 11/1994 | Rigling |
| 5,370,492 A | 12/1994 | Gleyze et al. |
| 5,377,851 A | 1/1995 | Asano et al. |
| 5,379,229 A | 1/1995 | Parsons et al. |
| 5,380,139 A | 1/1995 | Pohjonen et al. |
| 5,388,955 A | 2/1995 | Schroder |
| 5,397,212 A | 3/1995 | Watanabe et al. |
| 5,403,147 A | 4/1995 | Tanaka |
| 5,405,232 A | 4/1995 | Lloyd et al. |
| 5,418,732 A | 5/1995 | McFadin |
| 5,421,685 A | 6/1995 | Elmer et al. |
| 5,421,697 A | 6/1995 | Ostwald |
| 5,425,612 A | 6/1995 | Ebstein |
| 5,434,490 A | 7/1995 | Ishida et al. |
| 5,445,485 A | 8/1995 | Poulet |
| 5,460,476 A | 10/1995 | Gazza |
| 5,472,309 A | 12/1995 | Bernard, II et al. |
| 5,525,884 A | 6/1996 | Sugiura et al. |
| 5,529,165 A | 6/1996 | Shupert |
| 5,564,880 A | 10/1996 | Lederer |
| 5,588,796 A | 12/1996 | Ricco et al. |
| 5,601,395 A | 2/1997 | Lichti, Sr. et al. |
| 5,615,992 A | 4/1997 | Proske et al. |
| 5,632,350 A | 5/1997 | Gauvin |
| 5,664,688 A | 9/1997 | Kitanaka et al. |
| 5,707,199 A | 1/1998 | Faller |
| 5,718,551 A | 2/1998 | Ebstein |
| 5,725,063 A | 3/1998 | Ceragioli et al. |
| 5,764,014 A | 6/1998 | Jakeway et al. |
| 5,806,870 A | 9/1998 | Hull et al. |
| 5,810,540 A | 9/1998 | Castaldi |
| 5,833,431 A | 11/1998 | Rosse, III et al. |
| 5,839,872 A | 11/1998 | Goto et al. |
| 5,927,926 A | 7/1999 | Yagi et al. |
| 5,928,058 A | 7/1999 | Francis et al. |
| 5,988,306 A | 11/1999 | Ooishi |
| 6,036,427 A | 3/2000 | Kita et al. |
| 6,061,607 A | 5/2000 | Bradley et al. |
| 6,062,942 A | 5/2000 | Ogihara |
| 6,116,842 A | 9/2000 | Harris et al. |
| 6,149,366 A | 11/2000 | Deandrea |
| 6,257,597 B1 | 7/2001 | Galazin |
| 6,272,406 B2 | 8/2001 | Aloes et al. |
| 6,325,586 B1 | 12/2001 | Loy |
| 6,341,269 B1 | 1/2002 | Dulaney et al. |
| 6,345,217 B1 | 2/2002 | Zeitler et al. |
| 6,354,430 B1 | 3/2002 | De |
| 6,425,723 B1 | 7/2002 | Okada et al. |
| 6,439,955 B1 | 8/2002 | Feketo |
| 6,563,128 B2 | 5/2003 | Lublin et al. |
| 6,600,418 B2 | 7/2003 | Francis et al. |
| 6,629,502 B2 | 10/2003 | Matsukawa |
| 6,645,355 B2 | 11/2003 | Hanson et al. |
| 6,652,213 B1 | 11/2003 | Mitchell et al. |
| 6,655,297 B2 | 12/2003 | Kawato et al. |
| 6,695,328 B2 | 2/2004 | Cope |
| 6,721,638 B2 | 4/2004 | Zeitler |
| 6,748,292 B2 | 6/2004 | Mountz |
| 6,808,058 B2 | 10/2004 | Shiohara |
| 6,928,336 B2 | 8/2005 | Peshkin et al. |
| 6,929,440 B1 | 8/2005 | Grond |
| 6,948,899 B2 | 9/2005 | Lee |
| 6,950,722 B2 | 9/2005 | Mountz |
| 6,997,665 B2 | 2/2006 | Bouche et al. |
| 7,002,698 B2 | 2/2006 | Hanson et al. |
| 7,002,772 B2 | 2/2006 | Yardy |
| 7,003,375 B2 | 2/2006 | Inui |
| 7,008,164 B2 | 3/2006 | Rokkaku |
| 7,025,191 B2 | 4/2006 | Lichti et al. |
| 7,085,097 B2 | 8/2006 | Starr et al. |
| 7,100,294 B1 | 9/2006 | Goldsobel et al. |
| 7,101,139 B1 | 9/2006 | Benedict |
| 7,102,848 B2 | 9/2006 | Kumpon et al. |
| 7,110,855 B2 | 9/2006 | Leishman |
| 7,119,982 B2 | 10/2006 | Starr et al. |
| 7,128,196 B2 | 10/2006 | Oldford et al. |
| 7,128,521 B2 | 10/2006 | Hansel |
| 7,145,747 B2 | 12/2006 | Brace et al. |
| 7,192,034 B2 | 3/2007 | Radke et al. |
| 7,266,422 B1 | 9/2007 | DeMotte et al. |
| 7,319,320 B2 | 1/2008 | Kawashima et al. |
| 7,402,018 B2 | 7/2008 | Mountz et al. |
| 7,433,759 B2 | 10/2008 | Nangoy |
| 7,495,561 B2 | 2/2009 | Bodin et al. |
| 7,539,557 B2 | 5/2009 | Yamaguchi |
| 7,587,260 B2 | 9/2009 | Bruemmer et al. |
| 7,620,477 B2 | 11/2009 | Bruemmer |
| 7,661,920 B2 | 2/2010 | Kantola et al. |
| 7,668,621 B2 | 2/2010 | Bruemmer |
| 7,682,122 B2 | 3/2010 | Maynard et al. |
| 7,689,318 B2 | 3/2010 | Draper |
| 7,695,235 B2 | 4/2010 | Rallis |
| 7,730,781 B2 | 6/2010 | Zhang et al. |
| 7,769,513 B2 | 8/2010 | Breed et al. |
| 7,793,742 B2 | 9/2010 | Donaldson et al. |
| 7,801,644 B2 | 9/2010 | Bruemmer et al. |
| 7,866,671 B2 | 1/2011 | Madler |
| 7,909,562 B2 | 3/2011 | Mead |
| 7,931,431 B2 | 4/2011 | Benedict et al. |

(56) References Cited

U.S. PATENT DOCUMENTS

| | | | |
|---|---|---|---|
| 7,960,973 | B2 | 6/2011 | Zeller et al. |
| 7,965,871 | B2 | 6/2011 | Ihara et al. |
| 7,967,354 | B2 * | 6/2011 | Faulkner ............... B25J 9/0093 294/103.1 |
| 7,974,738 | B2 | 7/2011 | Bruemmer et al. |
| 7,991,505 | B2 * | 8/2011 | Lert, Jr. ............... B65G 1/0492 198/347.1 |
| 8,000,835 | B2 | 8/2011 | Friz et al. |
| 8,001,837 | B2 | 8/2011 | Larson et al. |
| 8,007,221 | B1 * | 8/2011 | More ...................... B25J 5/005 180/9.32 |
| 8,024,066 | B2 | 9/2011 | Reverte et al. |
| 8,041,456 | B1 | 10/2011 | Blackwell et al. |
| 8,042,627 | B2 | 10/2011 | Yang et al. |
| 8,060,257 | B2 | 11/2011 | Close et al. |
| 9,020,639 | B2 | 4/2015 | Bewley et al. |
| 9,037,286 | B2 | 5/2015 | Lert |
| 2002/0029719 | A1 | 3/2002 | Matsukawa |
| 2002/0076307 | A1 | 6/2002 | Fallin et al. |
| 2003/0033217 | A1 | 2/2003 | Cutlip |
| 2003/0185656 | A1 | 10/2003 | Hansl |
| 2003/0200129 | A1 | 10/2003 | Klaubauf et al. |
| 2004/0093116 | A1 | 5/2004 | Mountz |
| 2004/0136821 | A1 | 7/2004 | Berger et al. |
| 2004/0238326 | A1 | 12/2004 | Licthi |
| 2005/0047895 | A1 * | 3/2005 | Lert, Jr. ............... B65G 1/0492 414/273 |
| 2005/0095095 | A1 | 5/2005 | Hansl |
| 2005/0131645 | A1 | 6/2005 | Panopoulos |
| 2005/0151360 | A1 | 7/2005 | Bertrand et al. |
| 2005/0220600 | A1 | 10/2005 | Baker et al. |
| 2006/0018996 | A1 | 1/2006 | Pollock et al. |
| 2006/0210382 | A1 * | 9/2006 | Mountz ................. B60D 1/465 414/498 |
| 2006/0216137 | A1 | 9/2006 | Sakata et al. |
| 2006/0232025 | A1 | 10/2006 | Braud |
| 2006/0245862 | A1 | 11/2006 | Hansel et al. |
| 2006/0257236 | A1 | 11/2006 | Stingel, III et al. |
| 2007/0021864 | A1 | 1/2007 | Mountz et al. |
| 2007/0059132 | A1 | 3/2007 | Akamatsu et al. |
| 2007/0071585 | A1 | 3/2007 | Henkel |
| 2007/0177011 | A1 | 8/2007 | Lewin et al. |
| 2007/0288123 | A1 | 12/2007 | Dandrea |
| 2007/0297879 | A1 | 12/2007 | Yuyama et al. |
| 2008/0166217 | A1 | 7/2008 | Fontana |
| 2008/0275609 | A1 | 11/2008 | Boydell |
| 2008/0281717 | A1 | 11/2008 | Kortelainen |
| 2009/0074545 | A1 * | 3/2009 | Lert, Jr. ............... B65G 1/0492 414/276 |
| 2009/0099879 | A1 | 4/2009 | Ouimet |
| 2009/0114115 | A1 | 5/2009 | Minges |
| 2009/0185884 | A1 | 7/2009 | Wurman et al. |
| 2009/0188774 | A1 | 7/2009 | Tsujimoto |
| 2010/0102532 | A1 | 4/2010 | Timoney et al. |
| 2010/0131182 | A1 * | 5/2010 | Deegan ................... G01G 19/08 701/124 |
| 2010/0135759 | A1 | 6/2010 | Dillon |
| 2010/0145507 | A1 | 6/2010 | Blust et al. |
| 2010/0218697 | A1 | 9/2010 | Sugimoto |
| 2010/0272546 | A1 | 10/2010 | Wolkerstorfer |
| 2010/0290874 | A1 | 11/2010 | Wolkerstorfer |
| 2010/0316468 | A1 | 12/2010 | Lert et al. |
| 2010/0316469 | A1 * | 12/2010 | Lert ...................... B65G 1/045 414/273 |
| 2011/0008138 | A1 | 1/2011 | Yamashita |
| 2011/0176895 | A1 | 7/2011 | Kortelainen |
| 2012/0185122 | A1 | 7/2012 | Sullivan et al. |
| 2012/0189409 | A1 | 7/2012 | Toebes et al. |
| 2012/0195724 | A1 | 8/2012 | Toebes et al. |
| 2012/0247239 | A1 | 10/2012 | Hortig et al. |
| 2013/0061420 | A1 | 3/2013 | Vanderstegen-Drake et al. |
| 2013/0142599 | A1 | 6/2013 | McDowell, Jr. |
| 2014/0350725 | A1 | 11/2014 | Lafary et al. |
| 2015/0081089 | A1 | 3/2015 | Kapust et al. |
| 2015/0150429 | A1 | 6/2015 | Yoo et al. |
| 2015/0314446 | A1 | 11/2015 | Day et al. |
| 2016/0000282 | A1 | 1/2016 | Vanderstegen-Drake et al. |
| 2016/0121486 | A1 | 5/2016 | Lipinski et al. |
| 2017/0083020 | A1 | 3/2017 | Purwin et al. |

FOREIGN PATENT DOCUMENTS

| | | |
|---|---|---|
| EP | 0466004 | 1/1992 |
| EP | 0737630 | 10/1996 |
| EP | 1775240 | 4/2007 |
| EP | 2039580 | 3/2009 |
| FR | 2730715 | 8/1996 |
| JP | 07157013 | 6/1995 |
| JP | 2005206259 | 8/2005 |
| JP | 2008100825 | 5/2008 |
| JP | 2007131383 | 5/2017 |
| WO | 8501493 | 4/1985 |
| WO | 9534491 | 12/1995 |
| WO | 2005009324 | 2/2005 |
| WO | 2008152245 | 12/2008 |
| WO | 2010118412 | 10/2010 |

* cited by examiner

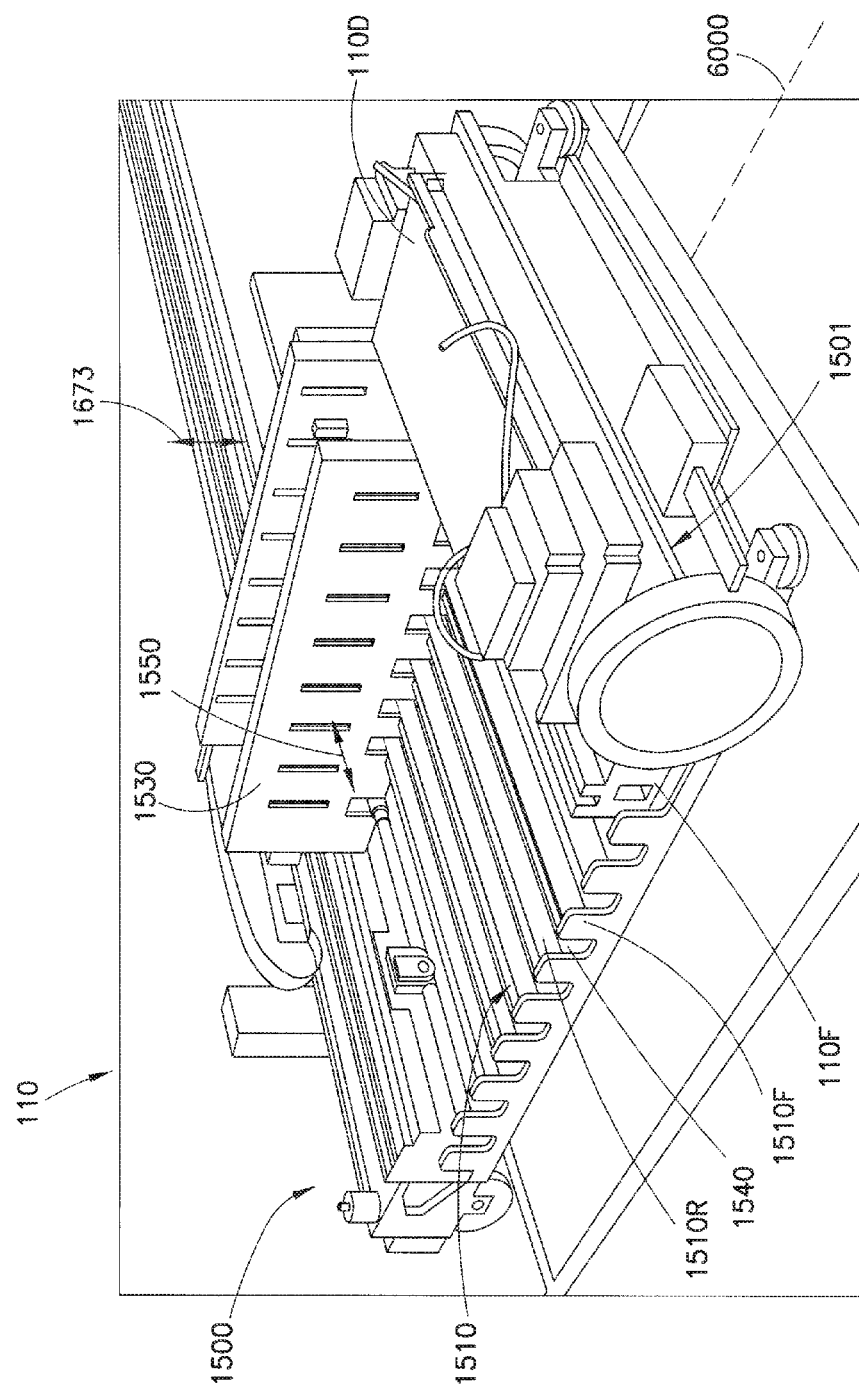

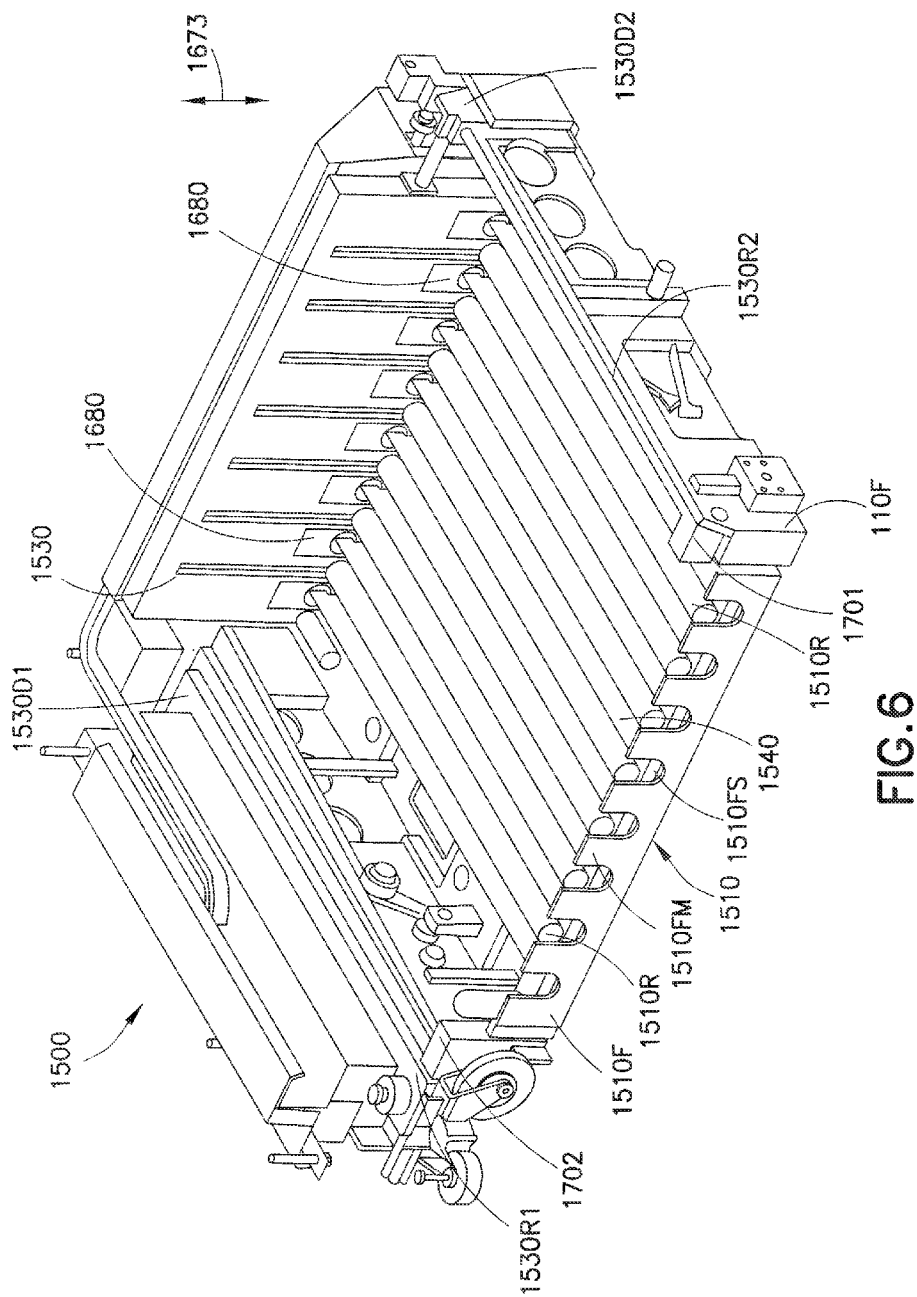

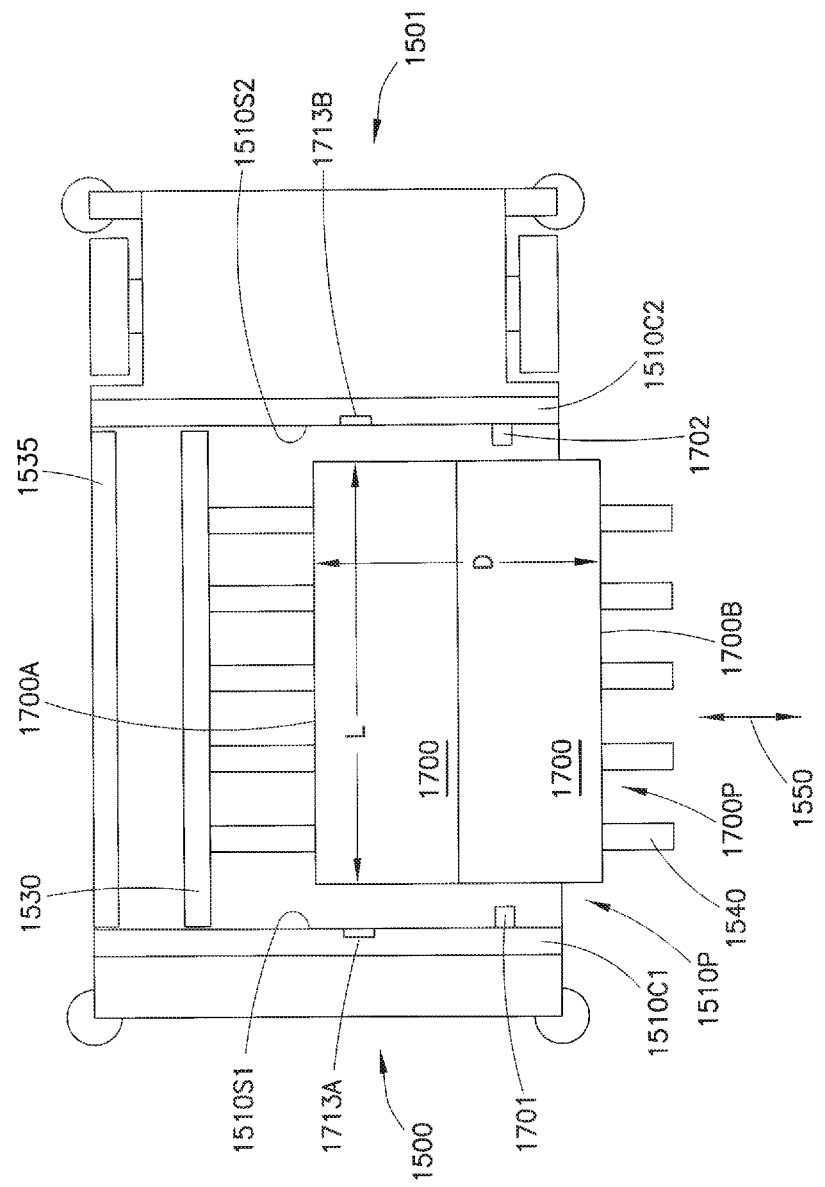

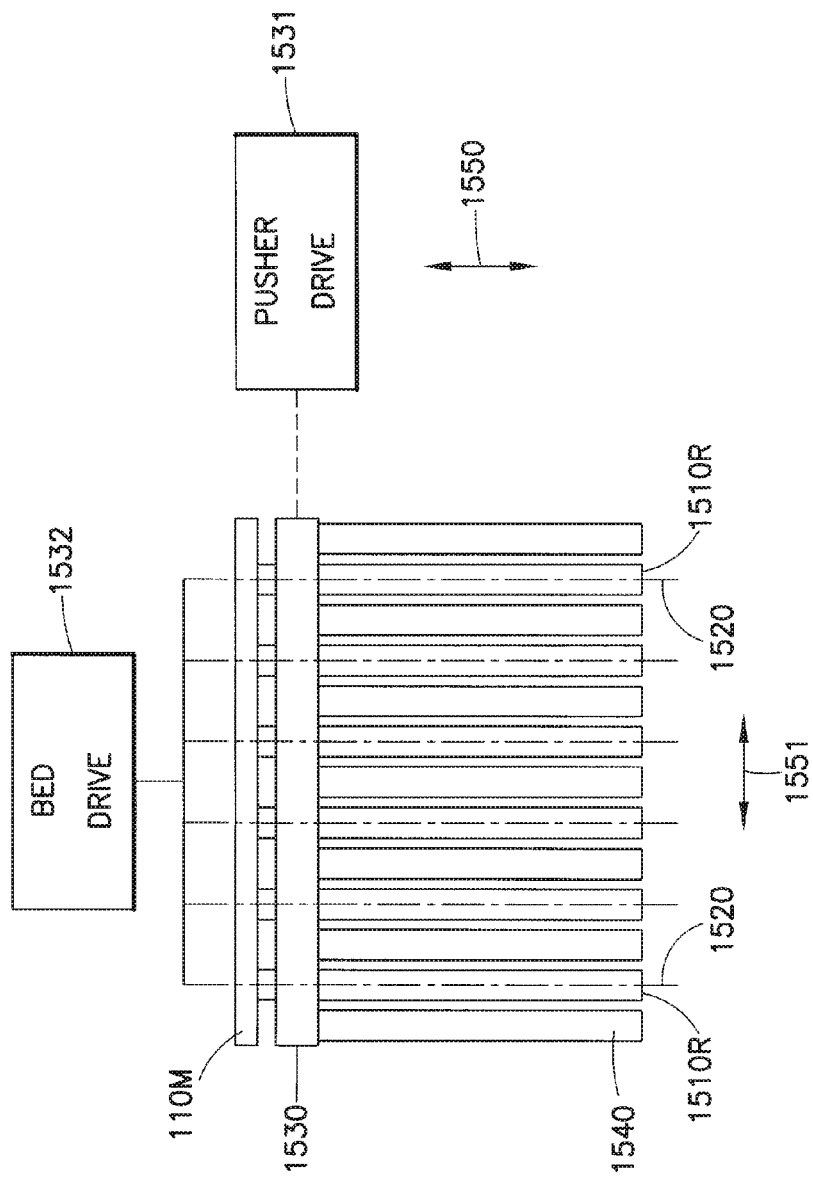

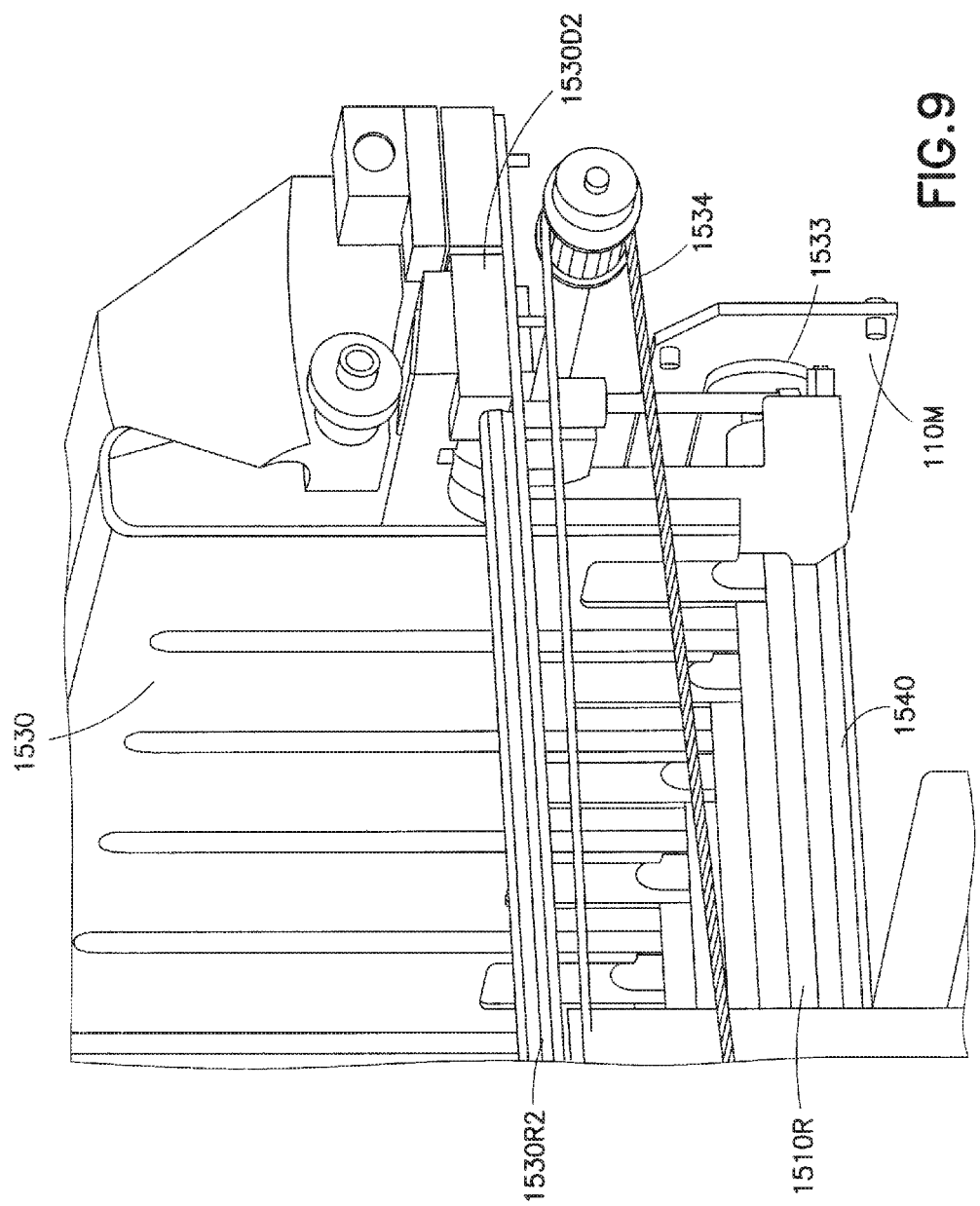

BOT PAYLOAD ALIGNMENT AND SENSING

CROSS-REFERENCE TO RELATED APPLICATIONS

This application is a continuation of and claims the benefit of U.S. application Ser. No. 15/605,748, having a filing date of May 25, 2017, which is a continuation of and claims the benefit of U.S. application Ser. No. 14/942,717, having a filing date of Nov. 16, 2015 (now U.S. Pat. No. 9,676,551, issued Jun. 13, 2017), which is a continuation of and claims the benefit of U.S. application Ser. No. 13/327,040, having a filing date of Dec. 15, 2011 (now U.S. Pat. No. 9,187,244, issued Nov. 17, 2015), which is a non-provisional of and claims the benefit of U.S. Provisional Patent Application No. 61/423,220, filed on Dec. 15, 2010, the disclosures of which are incorporated by reference herein in their entireties.

BACKGROUND

1. Field

The embodiments generally relate to storage and retrieval systems and, more particularly, to autonomous transports of the storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items transported to/from and stored on the storage racks are contained in carriers, for example storage containers such as trays, totes or shipping cases, or on pallets.

When transporting the cases to and from the storage racks with automated transports it would be advantageous to be able to locate the cases relative to the automated transport while holding the case securely during transport.

BRIEF DESCRIPTION OF THE DRAWINGS

The foregoing aspects and other features of the disclosed embodiments are explained in the following description, taken in connection with the accompanying drawings, wherein:

FIG. 5 is an illustration of the exemplary autonomous transport vehicle in accordance with the embodiments;

FIG. 6 is a schematic illustration of a portion the exemplary autonomous transport vehicle of FIG. 5 in accordance with the embodiments;

FIG. 7A is a schematic illustration of a portion the exemplary autonomous transport vehicle of FIG. 5 in accordance with the embodiments;

FIG. 8 is a schematic illustration of a portion the exemplary autonomous transport vehicle of FIG. 5 in accordance with the embodiments;

FIG. 9 is a schematic illustration of a portion the exemplary autonomous transport vehicle of FIG. 5 in accordance with the embodiments;

DETAILED DESCRIPTION OF THE EXEMPLARY EMBODIMENT(S)

Figure 1:
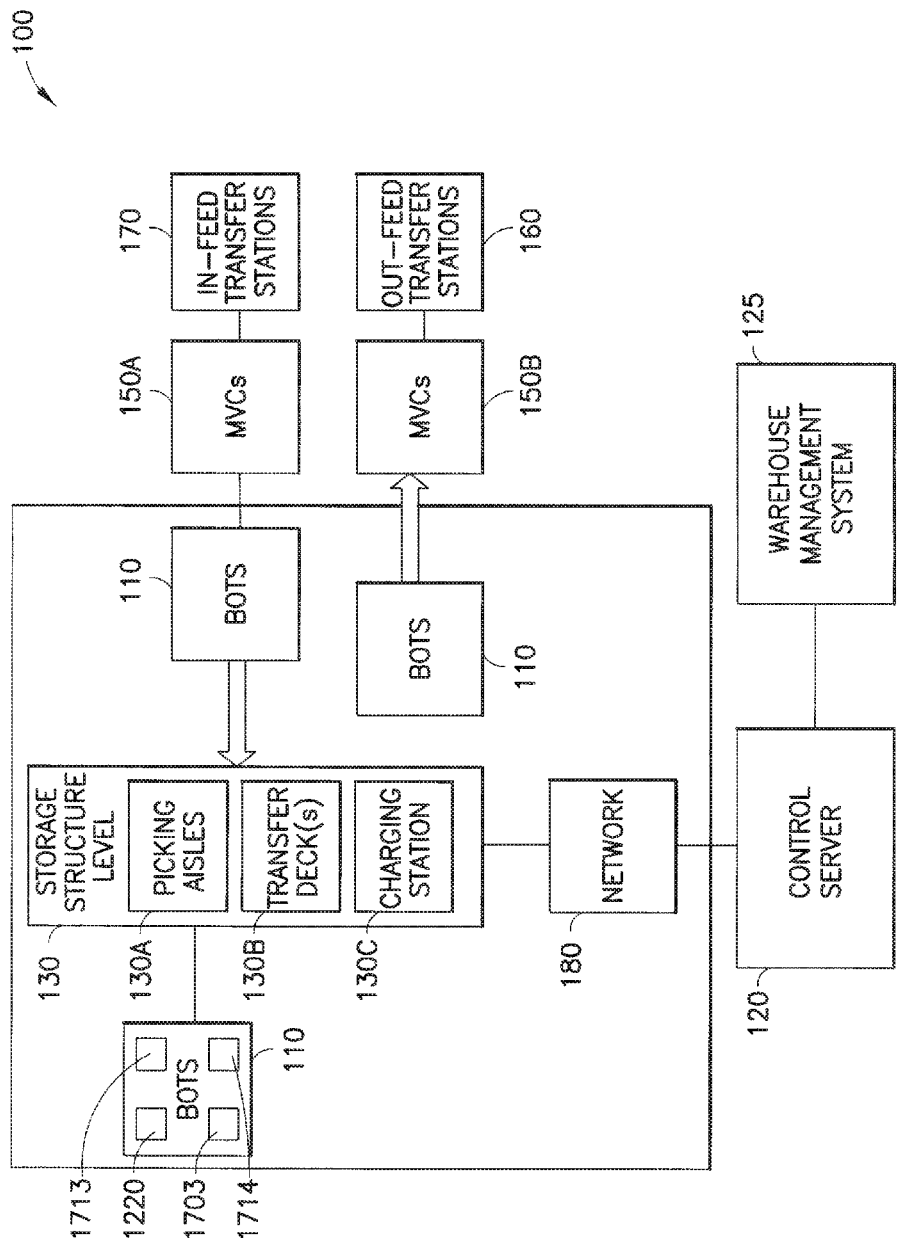
FIG. 1 schematically illustrates an exemplary storage and retrieval system in accordance with the embodiments.

FIG. 1 schematically illustrates an exemplary storage and retrieval system in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may be substantially similar to that described in, for example, U.S. patent application Ser. No. 12/757,381, entitled "STORAGE AND RETRIEVAL SYSTEM" and filed on Apr. 9, 2010, and U.S. Provisional Patent Application No. 61/423,340 entitled "Warehousing Scalable Storage Structure" with and filed on Dec. 15, 2010 (now U.S. patent application Ser. No. 13/326,674 filed on Dec. 15, 2011), the disclosures of which are incorporated by reference herein in their entireties and may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g. case of soup cans, boxes of cereal, etc.) or individual items that are adapted to be taken off of or placed on a pallet. In accordance with the embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In alternate embodiments the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B, a storage structure 130, and a number of autonomous transport vehicles or robots 110 (referred to herein as "bots"). The storage and retrieval system may also include robot or bot transfer stations (as described in, for example, U.S. patent application Ser. No. 12/757,220, entitled "STORAGE AND RETRIEVAL SYSTEM" and filed on Apr. 9, 2010, the disclosure of which is incorporated by reference herein in its entirety) that may provide an indirect interface between the bots 110 and the multilevel vertical conveyor 150A, 150B. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described herein as being dedicated inbound or in-feed conveyors 150A and outbound or out-feed conveyors 150B, each of the conveyors 150A, 150B may be used for both inbound and outbound transfer of case units/items from the storage and retrieval system. The multilevel vertical conveyors may be any suitable lifting devices for transporting case units between levels of the storage and retrieval system. It is noted that while multilevel vertical conveyors are described herein in other aspects the conveyors may be any suitable conveyors or transfer/picking devices having any suitable transport path orientation. Some non-limiting suitable examples of multilevel vertical conveyors can be found in, for example, U.S. patent application Ser. No. 12/757,354, entitled "LIFT INTERFACE FOR STORAGE AND RETRIEVAL SYSTEMS" and filed on Apr. 9, 2010, and U.S. Provisional Patent Application No. 61/423,298 entitled "LIFT INTERFACE FOR STORAGE AND RETRIEVAL SYSTEMS" and filed on Dec. 15, 2010 (now U.S. Pat. No. 8,998,554 issued on Apr. 7, 2015), the disclosures of which are incorporated by reference herein in their entireties and U.S. patent application Ser. No. 12/757,220, entitled "STORAGE AND RETRIEVAL SYSTEM," (previously incorporated by reference). For example, the multilevel vertical conveyors may have any suitable number of support shelves for transporting the case units to a predetermined level of the storage and retrieval system. The support shelves may have slatted supports configured to allow fingers of the bots 110 or in-feed/out-feed transfer stations 170, 160 to pass between the slats for transferring case units to and from the conveyor. It is noted that in the embodiments transfer of case units between the bots and the multilevel vertical conveyors may occur in any suitable manner.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. In the embodiments, the bots 110 may interface in any suitable manner with the multilevel vertical conveyors 150A, 150B such as through, for example, extension of a transfer arm or effector of the bot (which may have fingers for interfacing with slatted support shelves of the multi-level vertical conveyors) relative to a frame of the bot. Suitable examples of bots are described in U.S. patent application Ser. No. 12/757,312, entitled "AUTONOMOUS TRANSPORTS FOR STORAGE AND RETRIEVAL SYSTEMS" and filed on Apr. 9, 2010, United States Provisional Patent Application No. 61/423,365 entitled "AUTOMATED BOT WITH TRANSFER ARM" filed on Dec. 15, 2010 (now U.S. patent application Ser. No. 13/326,952, U.S. Provisional Patent Application No. 61/423,388 entitled "AUTOMATED BOT TRANSFER ARM DRIVE SYSTEM", filed on Dec. 15, 2010 (now U.S. patent application Ser. No. 13/326,993, U.S. Provisional Patent Application No. 61/423,359 entitled "BOT HAVING HIGH SPEED STABILITY" filed on Dec. 15, 2010 (now U.S. Pat. No. 8,965,619 issued on Feb. 24, 2015), and U.S. Provisional Patent Application No. 61/423, 206 entitled "BOT SENSING POSITION" filed on Dec. 15, 2010 (now U.S. Pat. No. 9,008,884, the disclosures of which are incorporated by reference herein in their entireties.

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. It is noted that, each level may also include respective bot transfer stations for providing an indirect interface between the bots and the multilevel vertical conveyors. In the embodiments, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). It is also noted that the storage and retrieval system may be configured so that each multilevel vertical conveyor serves a predetermined area of the array of storage spaces.

The storage structure 130 may also include charging stations 130C for replenishing, for example, a battery pack of the bots 110. In the embodiments, the charging stations 130C may be located at, for example, transfer areas 295 (FIG. 2) of the transfer deck 130B so that the bots 110 can substantially simultaneously transfer items, for example, to and from a multilevel vertical conveyor 150A, 150B while being charged. The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in the embodiments, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS" and filed on Apr. 9, 2010 (the disclosure of which is incorporated by reference herein in its entirety).

Figure 2:
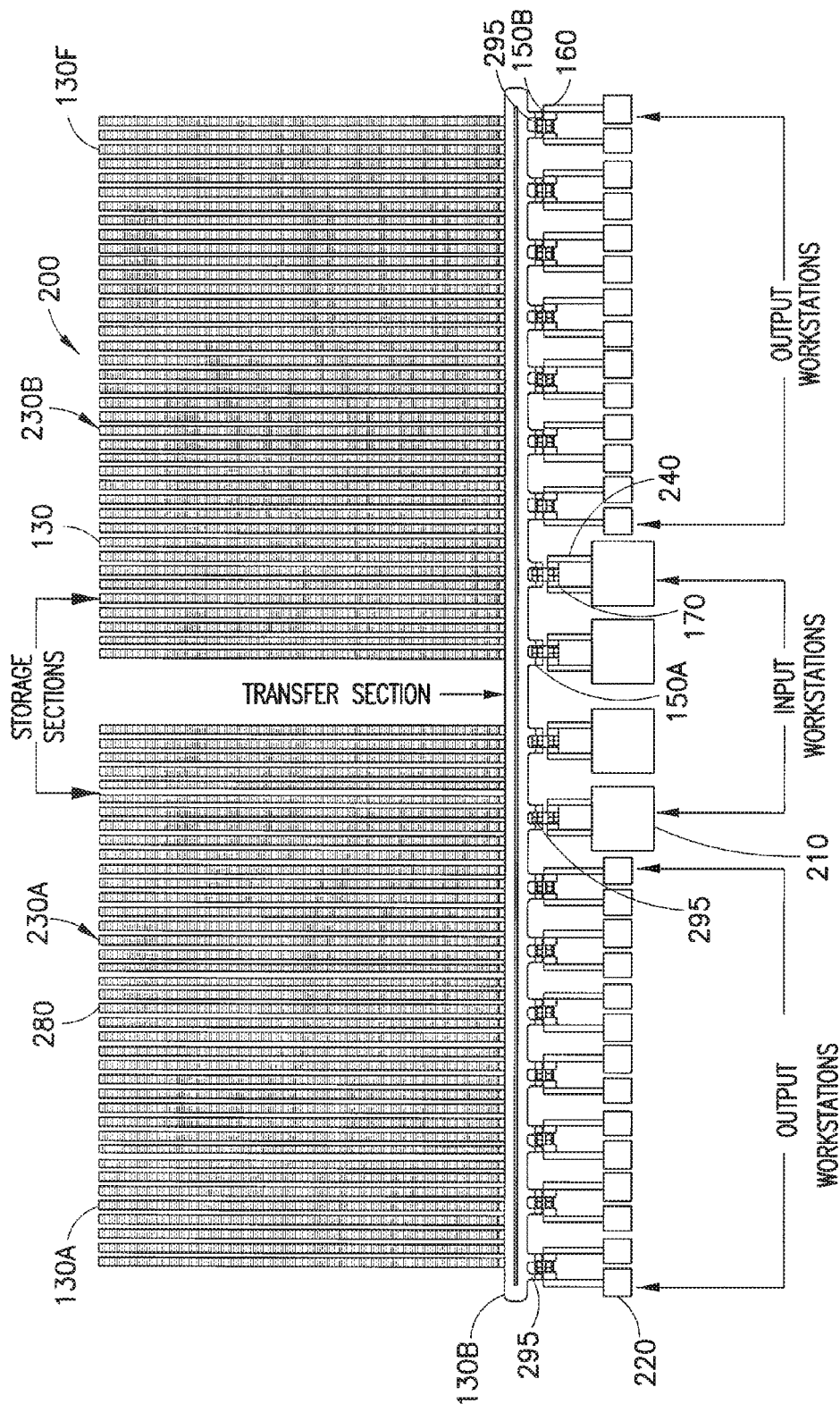
FIG. 2 illustrates a schematic plan view of an exemplary storage and retrieval system in accordance with the embodiments.
Figure 3:
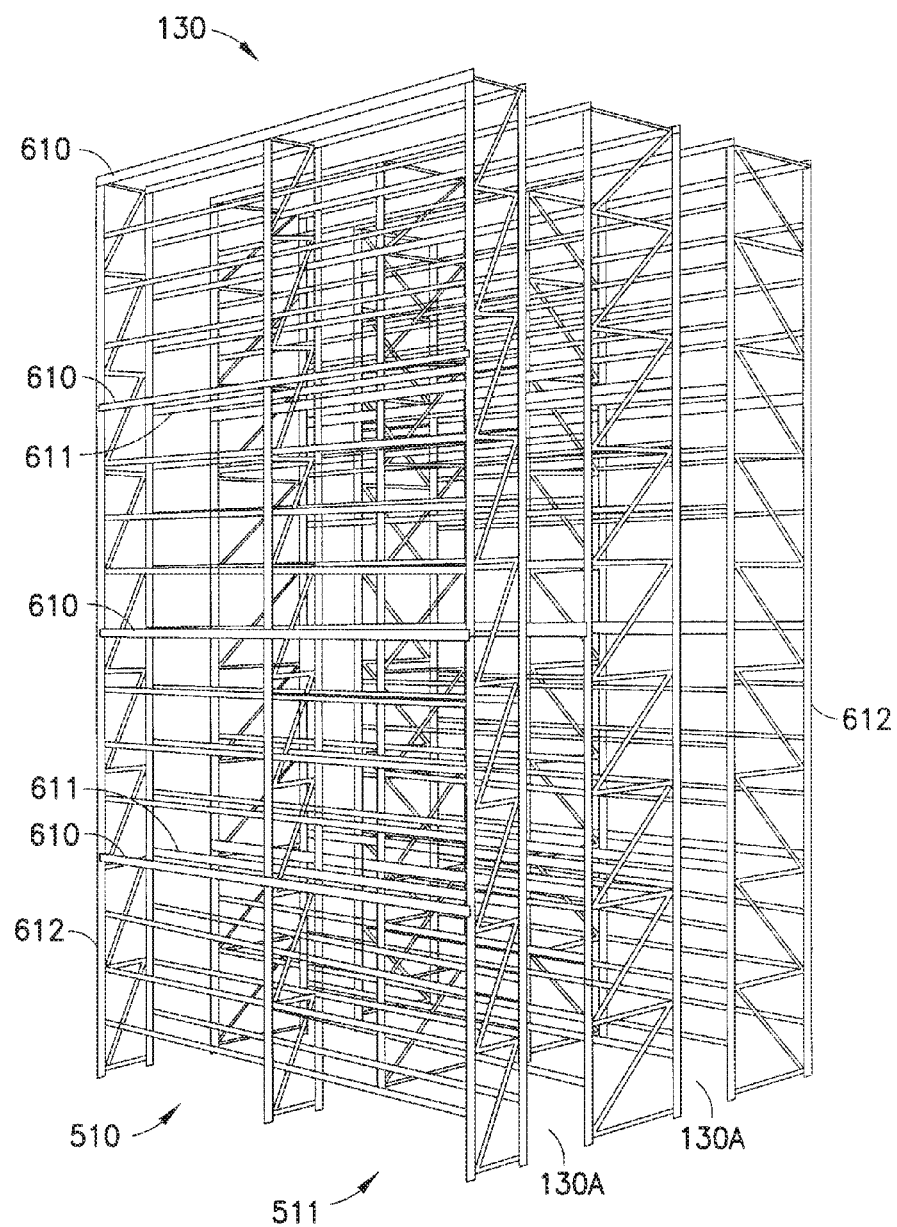
FIG. 3 illustrates a structural portion of a storage and retrieval system in accordance with the embodiments.

Referring also to FIG. 2, an exemplary configuration of the storage and retrieval system 100 is shown. Other suitable exemplary configurations of storage and retrieval systems can be found in, for example, U.S. Provisional Patent Application No. 61/423,340 entitled "Warehousing Scalable Storage Structure" filed on Dec. 15, 2010 (now U.S. patent application Ser. No. 13/326,674, and U.S. patent application Ser. No. 12/757,381, entitled "STORAGE AND RETRIEVAL SYSTEM" and filed on Apr. 9, 2010 (the disclosures of which are incorporated by reference herein in their entireties). It should be understood that the storage and retrieval system may have any suitable configuration. As can be seen in FIG. 2, the storage and retrieval system 200 is configured, for exemplary purposes only, as a single-ended picking structure in which only one side of the system 200 has a transfer section or deck 130B. The single-ended picking structure may be used in, for example, a building or other structure having loading docks disposed only on one side of the building. In the embodiments, the storage and retrieval system 200 includes transfer deck(s) 130B and picking aisles 130A that allow bots 110 to traverse an entirety of a level of the storage structure 130 on which that bot 110 is located for transporting items between any suitable storage locations/picking aisles 130A and any suitable multilevel vertical conveyors 150A, 150B. The multilevel vertical conveyors 150A, 150B provide transport of case units into the storage and retrieval system 200 through input workstations 210 and provide output of case units from the storage and retrieval system 200 through output workstations 220. In the embodiments, the storage and retrieval system 200 includes a first and second storage section 230A, 230B located side by side so that the picking aisles of each section are substantially parallel with each other and facing the same direction (e.g. towards transfer deck 130B). It is noted that the storage and retrieval system may have any suitable number of storage sections arranged relative to each other in any suitable configuration.

Figure 4A:
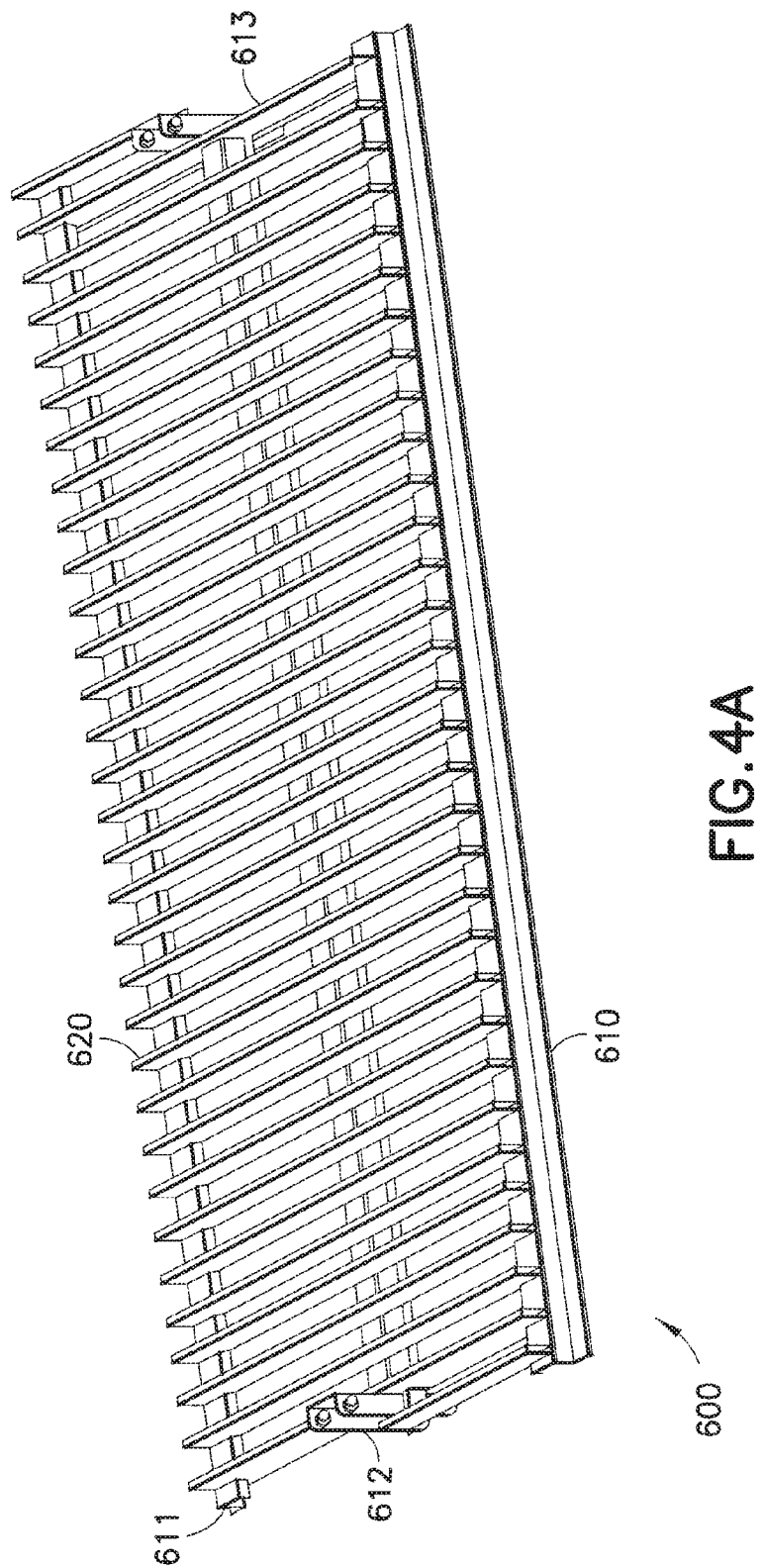
FIGS. 4A and 4B illustrate storage shelves in accordance with the embodiments.
Figure 4B:
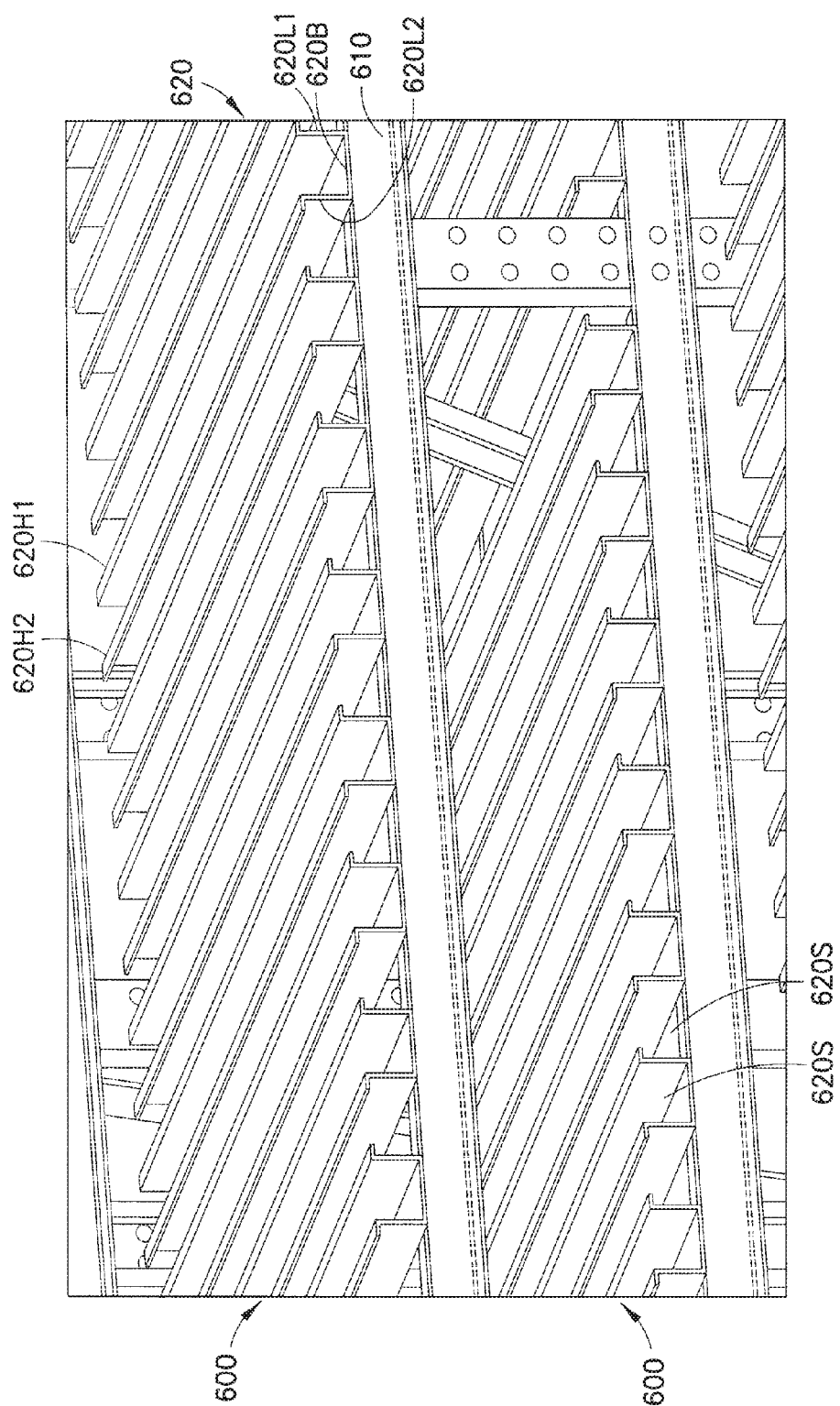

Referring to FIGS. 1, 3, 4A and 4B, each of the storage bays 510, 511 of the storage structure 130 may hold the picking stock on storage shelves 600 that are separated by aisle spaces 130A. In the embodiments the storage bays 510, 511 and storage shelves 600 may be substantially similar to those described in, for example, U.S. patent application Ser. No. 12/757,220, entitled "STORAGE AND RETRIEVAL SYSTEM," and U.S. patent application Ser. No. 12/757,381, entitled "STORAGE AND RETRIEVAL SYSTEM" (both of which being previously incorporated by reference). For example, the storage shelves 600 may include one or more support legs 620L1, 620L2 extending from, for example, the horizontal supports 610, 611, 613 (which are supported by vertical supports 612). The support legs 620L1, 620L2 may have any suitable configuration and may be part of, for example, a substantially U-shaped channel 620 such that the legs are connected to each other through channel portion 620B. The channel portion 620B may provide an attachment point between the channel 620 and one or more horizontal supports 610, 611, 613. It is noted that, each support leg 620L1, 620L2 may also be configured to individually mount to the horizontal supports 610, 611, 613. In the embodiments, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. It is noted that the leg portions 620H1, 620H2 may have a suitable thickness or have any other suitable shape and/or configuration for supporting case units stored on the shelves. As can be seen in FIGS. 4A and 4B, the support legs 620L1, 620L2 or channels 620 may form a slatted or corrugated shelf structure where spaces 620S between, for example, the support legs 620L1, 620L2 allow for arms or fingers of the bots 110 to reach into the shelving for transferring case units to and from the shelves. It is also noted that transfer of items to and from the multilevel vertical conveyors 150A, 150B (whether the transfer is made directly or indirectly by the bot 110) may occur in a substantially similar manner to that described above with respect to the storage shelves 600. It is noted that the spacing between the case units on the shelves may be any suitable spacing. It is also noted that transfer of case units to and from the multilevel vertical conveyors 150A, 150B (whether the transfer is made directly or indirectly by the bot 110) may occur in a substantially similar manner to that described above with respect to storage shelves 600.

Referring to FIG. 5 an exemplary bot 110 is shown. In the embodiments the bot 110 includes a longitudinally extended frame 110F that has a first end 1500 and a second end 1501 where the longitudinal axis 6000 extends from the first end 1500 to the second end 1501. At least one drive section 110D may be coupled to one of the first and/or second ends 1500, 1501 in any suitable manner for driving the bot 110 along the transfer deck(s) 130B and picking aisles 130A (FIG. 1). The drive 110D may include drive wheels, tracks or any other suitable drive mechanism for effecting travel of the bot along the transfer deck(s) 130B and picking aisles 130A. The other end of the bot 110 may have any suitable supports, such as caster wheels, fixed wheels, steerable wheels, and similar mechanisms for movably supporting the bot 110 as it travels along the transfer deck(s) 130B and picking aisles 130A. The bot 110 may have any suitable controller 1220 (FIG. 1) for effecting operation of the bot 110 (as described herein) and/or communication between the bot 110 and the control server 120 (FIG. 1). As may be realized the configuration of the bot shown in the drawings is merely exemplary and it should be understood that the bot may have any suitable configuration for carrying out the detection and positioning of case units relative to the bot 110 as described herein.

Referring now to FIGS. 5, 6, 7A and 7B the frame 110F of the bot 110 forms a payload bed 1510 that is configured to hold case units or any other suitable payload. The payload bed 1510 may be suitably sized for accepting (e.g. holding) any case unit 1700 (or pickface 1700P where a pickface is one or more cases that is to be picked and carried by the bot 110) that may be transferred into or removed from the storage and retrieval system 100. For example, in the embodiments the payload bed 1510 may be larger than an expected pick size (i.e. larger than the pickface 1700P the bot is expected to pick from, for example, the storage shelf 600 or any other suitable component of the storage and retrieval system such as the multilevel vertical conveyors). In this example, the pickface 1700P is shown as including two case units 1700 arranged laterally with respect to longitudinal axis 6000 of the bot 110. However, the pickface may include any suitable number of case units arranged laterally, longitudinally or in a lateral/longitudinal grid pattern.

The payload bed 1510 may include any suitable guide surfaces for allowing the case units to be transferred into the payload bed 1510 without obstruction. For example, in the embodiments the frame 110F forming the payload bed 1510 may include one or more flanges 1510C1, 1510C2 on the sides 1510S1, 1510S2 of the payload bed 1510. In this example, the flanges 1510C1, 1510C2 may be chamfered or angled surfaces at a top opening 1510TP of the payload bed 1510. The angled surfaces substantially form a wedge shape so that on contact with an edge of the case unit during transfer of the pickface into the payload area (e.g. lowering of the case unit into the payload area in the direction of arrow 1673) the angled surfaces guide the case unit(s) 1700 of the pickface 1700P into the payload area without obstructions (e.g. the case unit(s) being snagged or otherwise caught on a portion of the bot 110). The unobstructed transfer of the case units to the bot payload area facilitates loading of the case unit in one pick (e.g. substantially without repositioning the pickface or retrying the loading of the pickface onto the bot 110). While in this example the flanges 1510C1, 1510C2 are shown as being substantially straight surfaces it should be understood that the flanges may have any suitable shape and/or configuration such as for exemplary purposes only, arcuate. Also in this example, the flanges 1510C1, 1510C2 are shown as terminating substantially at an edge 1510E of the payload area, but it should be understood that the flanges may extend past the edge 1510E. Still, the flanges may be moveable or retractable such that when case units are loaded into the payload bed 1510 the flanges are moved to extend past the edge 1510E to guide the case units into the payload area and once the case units are loaded, the flanges are retracted so they do not protrude past the edge 1510E. Also, the flanges may be pivotable between a vertically upright position and the angled position shown in, for example, FIG. 7B.

A fence 1510F may be located at a side opening 1510P of the payload bed 1510. In the embodiments the fence 1510F may be attached to the frame 110F in any suitable manner such as with fasteners or welding. It is noted that the fence 1510F may form part of the frame 110F or be of unitary construction with the frame 110F. In the embodiments the fence may include slots 1510FS disposed between stopping members 1510FM. The slots 1510FS may be configured to allow the fingers 1540 to extend through the fence 1510F between the stopping members 1510FM in a substantially lowered position so that the fingers 1540 can be, for example, extended into a storage shelf 600 below a case unit. The stopping members 1510FM may be configured to extend above the payload bed 1510 to form a barrier that substantially prevents case units from exiting the payload bed 1510 once the case units are positioned on the payload bed 1510. In this example, the number of slots 1510FS is equal to the number of fingers 1540 but in alternate embodiments, the fence 1510F may be configured such that more than one finger 1540 passes through a single slot (e.g. the number of slots is less than the number of fingers). It should be noted that the fence may also have any suitable configuration for preventing case units from exiting the payload area when the case units are carried by the bot 110. For example, the fence may be movable so that the stopping members are retractable such that when in an extended configuration the fence prevents the case units from exiting the payload area.

The payload bed 1510 may include any suitable payload supports for supporting the case units when the case units are carried by the bot 110. For exemplary purposes only, in the embodiments the payload supports may include a "fluid" (or otherwise movable) bed. In one example, the bed may include rollers 1510R, where a rotational axis of each roller 1510R is disposed substantially transversely (or laterally) to the longitudinal axis 6000 of the bot 110. The payload supports may also be belts, ball bearings or any other suitable "fluid" support that moves the case units on the payload bed for at least in part justifying a location of the case unit relative to the payload bed/bot as will be described in greater detail below. Each roller may be supported within the frame 110F in any suitable manner. In this example, the rollers may be rotatably supported on one end at least in part by the fence 1510F adjacent the side opening 1510P of the payload bed 1510 and rotatably supported on the other opposite end by any suitable frame member, such as frame member 110M (FIG. 9). In the embodiments the rollers 1510R (or other suitable payload supports) may be interdisposed with fingers 1540 of the bot 110 in an alternating manner. It is noted that the rollers 1510R and the fingers 1540 may be arranged relative to each other in any suitable manner. The rollers may be connected to any suitable drive 1532 (FIG. 8) for rotating the rollers 1510R about their axes for moving case units on the payload bed 1510 as will be described in greater detail below. For exemplary purposes only, the drive 1532 may be a belt and pulley drive 1533 as shown in FIG. 8 but it should be understood that the drive 1532 may be any drive capable of causing rotation of the rollers 1510R.

The fingers 1540 of the bot 110 extend laterally relative to the longitudinal axis 6000 of the bot. The fingers 1540 are also capable of movement in the direction of arrow 1673 (e.g. in a direction substantially perpendicular to the direction 1550 of extension and retraction of the fingers). The fingers may be driven by any suitable drive for lifting the pickfaces 1700P over the fence 1510F and into/out of the payload bed 1510 of the bot 110. One example, of a drive unit that may drive the fingers 1540 can be found in United States Provisional Patent Application No. 61/423,388 entitled "AUTOMATED BOT TRANSFER ARM DRIVE SYSTEM," filed on Dec. 15, 2010 (now U.S. patent application Ser. No. 13/326,993, previously incorporated by reference.

A case unit contact member 1530 may be movably located at least partially within the payload area. The case unit contact member 1530 may be driven laterally in the direction of arrow 1550 by any suitable drive 1531. For exemplary purposes only, the drive 1531 may be a belt and pulley drive 1534 (FIG. 9) but it should be understood that the drive may be any suitable drive for causing movement of the case unit contact member in the direction of arrow 1550. In the embodiments both of the case unit contact member 1530 and the fingers 1540 are configured to move laterally in the direction of arrow 1550. The case unit contact member 1530 may be configured to move along rails 1530R1, 1530R2. The rails may be mounted to the frame 110F in any suitable manner for guiding the movement of at least the case unit contact member 1530. It should be understood that the movement of the case unit contact member 1530 may be guided in any suitable manner. For exemplary purposes only, referring to FIG. 9, the case unit contact member 1530 may have slide members 1530D1, 1530D2 for movably coupling the case unit contact member 1530 to the rails 1530R1, 1530R2. The case unit contact member 1530 may be independently movable in the direction of arrow 1550 for engaging case units disposed on the payload bed 1510 as will be described in greater detail below.

Figure 10:
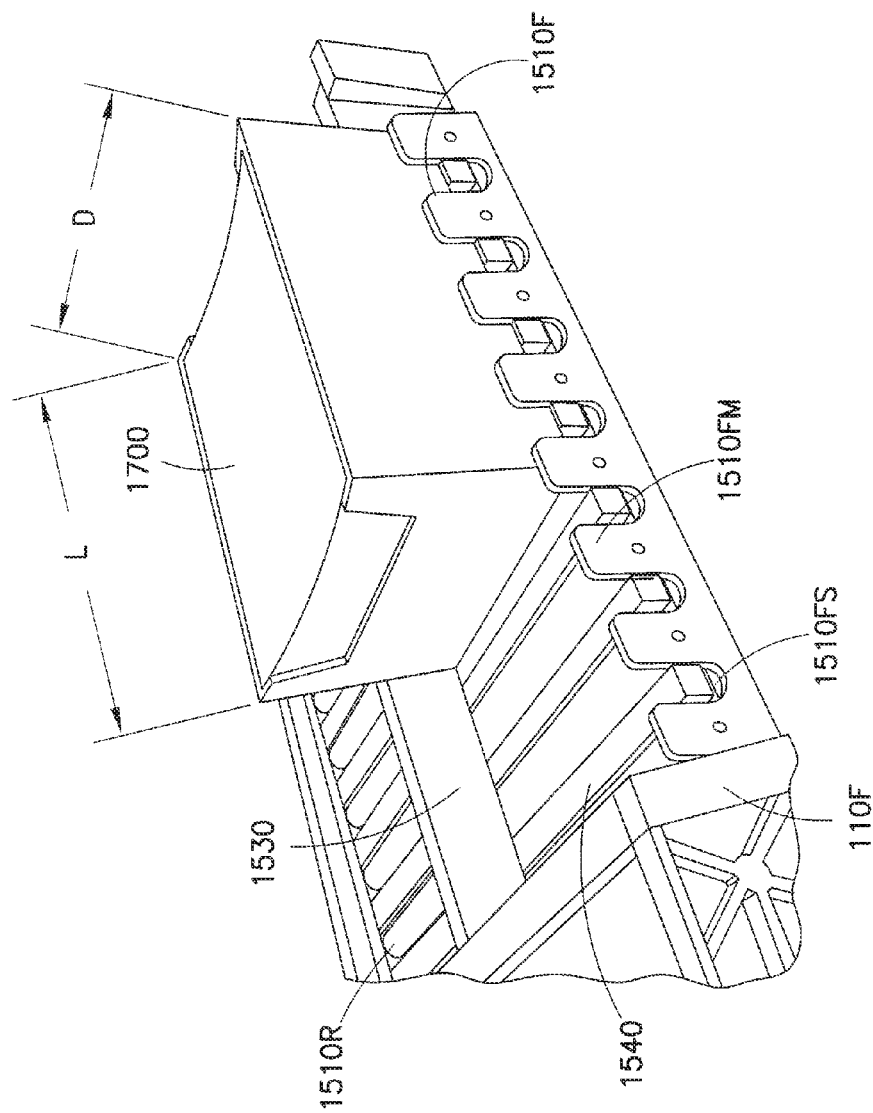
FIG. 10 is an illustration of a portion of the exemplary autonomous transport vehicle of FIG. 5 in accordance with the embodiments.

Referring to FIGS. 6 and 10 the case unit contact member 1530 may be configured to allow the fingers to move in the direction of arrow 1673 (e.g. perpendicular to the plane of extension and retraction of the case contact member 1530 and fingers 1540 in the direction of arrow 1550). For example, the case unit contact member 1530 may include any suitable slots 1680 that allow each finger to be lifted in the direction of arrow 1673 without substantially contacting the case unit contact member 1530. In this example, the case unit contact member has a slot 1680 for each finger 1540 but it should be understood that the slots 1680 may have any suitable configuration such as for example, a configuration that allocated one slot to more than one finger 1540. As described above, the fence 1510F includes slots 1510FS that allow the fingers 1540 to pass through the fence 1510 in a substantially lowered position as well as in a raised position when transferring case units to and from the payload bed 1510.

Figure 7B:
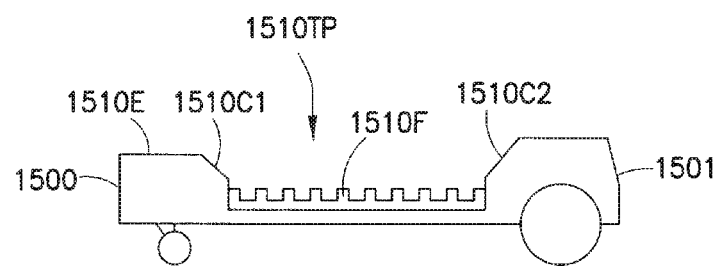
FIG. 7B is another schematic illustration of a portion the exemplary autonomous transport vehicle of FIG. 5 in accordance with the embodiments.
Figure 7C:
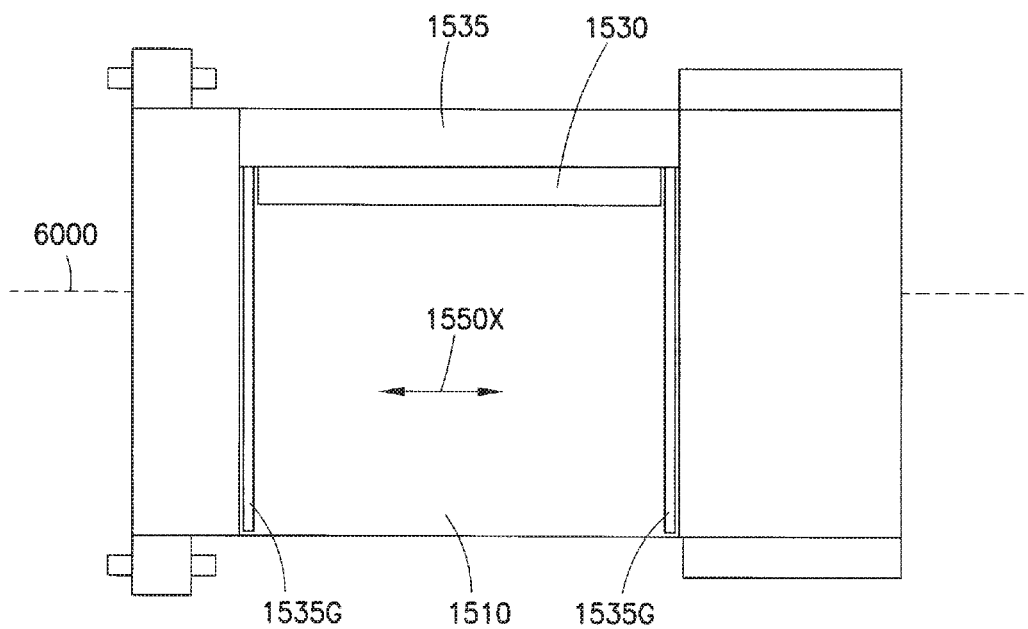
FIG. 7C is an illustration of the exemplary autonomous transport vehicle in accordance with an aspect of the disclosed embodiment.

In other aspects, referring to FIG. 7C, the bot 110 may include one or more side blades 1535G mounted to the bot arm 110A. One or more of the blades 1535G may be moved along the longitudinal axis 6000 of the bot 110 in the direction of arrow 1550X for aligning the pickface (e.g. one or more case units 1700A) on the bot arm 110A. The translational movement of the one or more side blades 1535G may allow for the positioning of the bot payload anywhere along the longitudinal axis of the bot within the bot payload area and may provide fine adjustment for case positioning onto the storage shelves 600. It is noted that in this aspect the side blades 1535G may not carry, transport or lift the case units 1700A but may aid in case unit 1700A control during picking and placing the case units. It is noted that one side blade 1535G may be fixed and act as a datum for aligning the case units 1700A.

Referring again to FIGS. 1, 6, 7A and 7B the bot 110 may also include any suitable sensor(s) 1703 for detecting the pickface 1700P (and case units 1700 that make up the pickface) as they are transferred to and from the payload bed 1510. In the embodiments the sensor 1703 may be a through-beam sensor. The sensor 1703 may include a transmitter 1701 and receiver 1702 that are, for example, mounted to the frame (in any suitable manner) adjacent a side opening 1510P of the payload bed 1510. The sensor 1703 may be configured and positioned on the bot 110 to sense the edges of the pickface 1700P when the pickface 1700P is transferred between, for example, a storage shelf 600 or multilevel vertical conveyors 150A, 150B and the payload bed 1510. In the embodiments the sensor 1703 may be configured to sense the leading and trailing edges 1700A, 1700B of the pickface 1700P as the pickface 1700P passes by the sensor 1703 to determine, for example, the depth D of the pickface 1700P. It should be understood that the sensor may be configured to sense any suitable feature of the pickface 1700P (e.g. the pickface as a unit and/or each individual case unit of the pickface) for determining, for example, any suitable dimensions of the pickface 1700P. In the embodiments, the bot controller 1220 (or any other suitable controller such as for example the control server 120) may be configured to register a detection signal(s) from the sensor 1703 during transfer of the case unit(s) to and/or from the bot 110. The controller 1220 may be configured to respond to the detection of the leading edge 1700A and trailing edge 1700B of the pickface 1700P for determining the depth D of the pickface 1700P. As may be realized, which edge of the pickface is the leading edge depends on which direction the pickface 1700P is travelling. For example, as the pickface 1700P enters the payload area the edge closest to the case unit contact member 1530 is the leading edge and as the pickface 1700P leaves the payload area the edge closest to the case unit contact member 1530 is the trailing edge of the pickface 1700P. For exemplary purposes only, the controller 1220 may be configured to use the leading and trailing edge sensor signals along with any other suitable information/data (such as for example indexing of a drive that drives the movement of fingers 1540 as they are extended and retracted from/to the payload bed area) for determining the pickface depth D.

The sensor 1703 may also be configured to sense if the pickface 1700P extends beyond the opening 1510P of the payload bed 1510. If the pickface does extend beyond the opening of the payload bed 1510 the controller 1220 may be configured to cause the bot 110 to time out (e.g. halt operation) so that corrective action can be taken if such an "overhanging" of the payload is detected. Such corrective action may include but is not limited to returning the payload to the storage shelf 600 from which the case was picked or if the case was picked from a multilevel vertical conveyor to a storage shelf in a location where the case units/pickfaces can be inspected and redirected to an appropriate location within the storage and retrieval system. Such corrective action may also include the bot effecting the stopping of the multilevel vertical conveyor either through communication between the bot and the multilevel vertical conveyor or through communication with, for example, the control server 120 (or any other suitable controller that communicates with both the bots and the multilevel vertical conveyor). As may be realized, the bot may include other suitable sensors to determine what amount the pickface 1700P extends beyond the opening 1510P of the payload bed 1510 where the controller 1220 only allows the bot 110 to be redirected to, for example, an inspection area if the overhang of the pickface is less than a predetermined overhang amount. The predetermined overhang amount may be any suitable overhang distance such that the overhanging pickface will not contact the structure of the storage and retrieval system, other bots or other pickfaces during redirection to, for example, the inspection area. As may also be realized, the sensor 1703 can also be used to detect and measure any gaps between the cases of the pickface.

In the embodiments, the bot 110 may also have any suitable sensors for detecting the length L (FIG. 7) of the pickface 1700P. For example, the bot 110 may include sensors 1713A, 1713B each disposed at opposite longitudinal ends of the payload bed 1510. For exemplary purposes only, the sensors 1713 may be contact plates, through beam sensors, load cells or any other suitable sensors that detect, for example, substantial contact between the case unit and the side of the payload bed 1510. The bot controller 1220 may also be configured to monitor strain (e.g. an increase in current, etc.) on the drive 1532 for detecting substantial contact between the case unit 1700 and the side 151S1, 151S2. It should be understood that while the sensors 1713 are shown in the figures as being located adjacent the sides 1510S1, 1510S2, the sensors 1713 may be located in any suitable location of the bot 110 for sensing the substantial contact between the case unit and the sides 1510S1, 1510S2.

In the embodiments, when the pickface 1700P is disposed on, for example, the rollers 1510R of the payload bed 1510, the rollers may be driven in a first direction 1551 until the pickface 1700P is sensed by a first one of the sensors 1713A, 1713B (e.g. the pickface substantially contacts a side 1510S1, 1510S2 of the payload bed 1510). A first detection signal may be sent to, for example, the bot controller 1220 indicating the pickface is disposed at a first side of the payload bed 1510. Where the pickface includes more than one case unit the rollers may continue to be driven a predetermined amount of time after a first case unit of the pickface 1700P is sensed by the sensor 1713A, 1713B so that the remaining case units 1700 of the pickface 1700P also substantially contact the side 1510S1, 1510S2 of the payload bed 1510. The rollers may then be driven in the opposite direction 1551 so that the pickface is driven towards and is sensed by the other sensor 1713A, 1713B (e.g. substantially contacts the other side 1510S1, 1510S2) disposed on the opposite side of the payload bed 1510. A second detection signal may be sent to, for example, the bot controller 1220 indicating the pickface is disposed at a second side of the payload bed 1510. Again where the pickface 1700P includes more than one case unit the roller may continue to be driven a predetermined amount of time after a first one of the case units is sensed by the sensor 1713A, 1713B to allow the other case units of the pickface to substantially contact the side 1510Sa, 1510S2. The bot controller 1220 may be configured to determine the length L of the pickface using the first and second detection signals from the sensors 1713A, 1713B in combination with, for example, data regarding the operation of the bed drive or motor 1532. It should be understood that the length L of the pickface 1700P may be determined in any suitable manner using any suitable sensors by any suitable processor or controller. In one example, the bot 110 may be configured to send pickface measurement data to, for example, control server 120 for determining the measurements of the pickface.

Referring to FIGS. 1, 5, 6, 7A, 7B, 8, 10 and 11 an exemplary operation of the bot 110 will be described. The bot 110 may be instructed by, for example the control server 120 to pick a pickface 1700P from a multilevel vertical conveyor 150A or a storage shelf 600. The bot 110 extends the fingers 1540 through the slots 1510FS in the fence 1510F and underneath the case unit to be picked. The pickface is lifted by the fingers 1540 and carried into the payload bed area. As may be realized the fingers 1540 may be raised so that when the case unit(s) are transferred into and out of the payload area of the frame 110F, the case unit(s) are carried over the stopping members 1510FM of the fence substantially without contacting the stopping members 1510FM. As the fingers are retracted into the payload bed area the controller 1220 determines the depth D of the pickface 1700P as described above (FIG. 11, Block 1102). For example, as the pickface 1700P is carried into the payload area of the bot 110 the sensor 1703 senses a first or leading edge 1700A as well as the second or trailing edge 1700B of the pickface 1700P as well as any gaps between, for example, the cases that form the pickface where the pickface includes multiple cases. As described above, the controller 1220 detects the signals from the sensor 1703 corresponding to the sensing of the first and second edges 1700A, 1700B and along with other suitable information (such as for example, data regarding the operation of the finger extension/retraction drive motor) determines the depth D of the pickface 1700P being transferred into the payload area.

The bot controller 1220 and/or the control server 120 may be programmed with an expected depth of the pickface 1700P being picked by the bot. In the embodiments the bot controller 1220 may communicate with the control server 120 and inform the control server of the pickface depth D. If the determined pickface depth D matches the expected pickface depth then a confirmation may be sent by the control server 120 to the bot controller 1220 that the correct pickface 1700P has been picked and commands the bot 110 to proceed with transportation of the pickface 1700P. In the embodiments, if the determined pickface depth D does not match the expected pickface depth then the control server 120 commands the bot 110 to return the pickface 1700P to the storage shelf 600 from which the pickface 1700P was obtained or commands the bot 110 to redirect the pickface 1700P to an area of the storage and retrieval system where the pickface 1700P can be, for example, inspected. In the embodiments if the determined pickface depth D does not match the expected pickface depth the bot 110 may be configured to verify its location within the storage and retrieval system 100 and/or re-measure the depth D of the case unit. If the pickface depth D is determined to be incorrect after bot location verification and/or pickface depth re-measurement a fault signal may be sent to, for example, the control server 120 and the bot may return the pickface 1700P back to the storage shelf 600 from which the pickface 1700P was obtained or redirect the pickface 1700P to any other suitable location within the storage and retrieval system. The bot 110 may then proceed to, for example, another storage location, multilevel vertical conveyor, etc. for picking another case unit.

Figure 11:
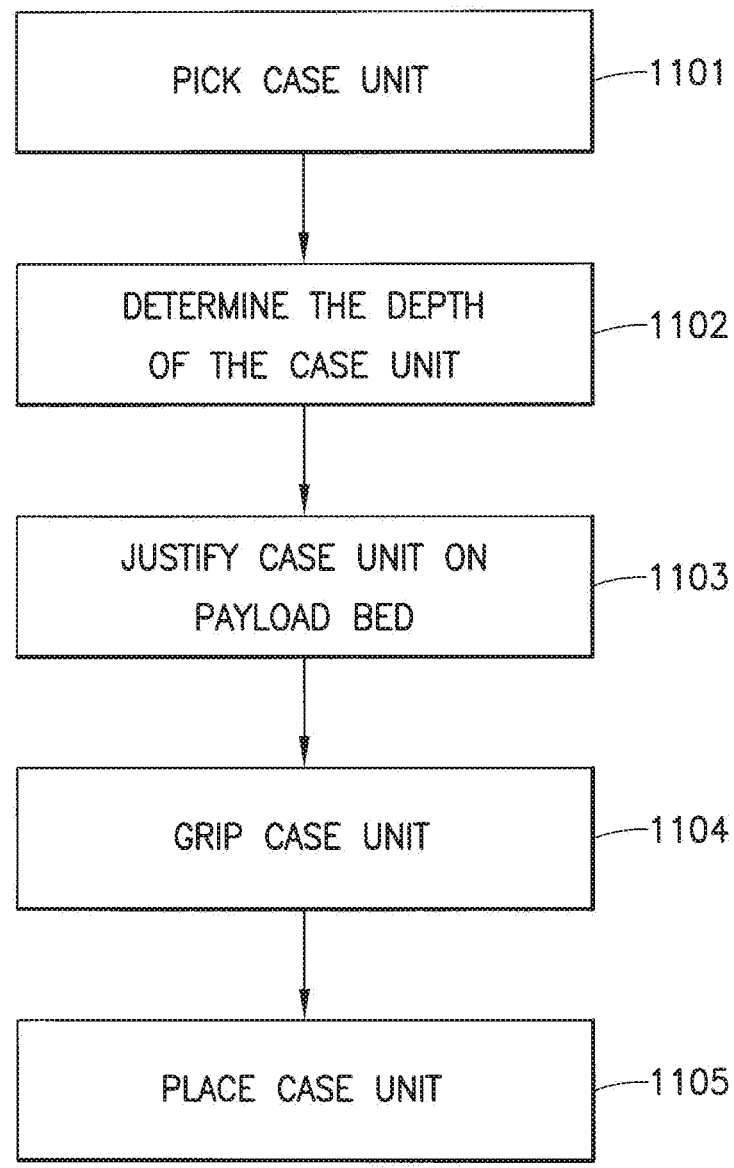
FIG. 11 is a flow diagram in accordance with the embodiments.

If the pickface 1700P is verified as being the correct case unit, the bot 110 may be configured to justify the pickface 1700P to a predetermined position on the payload bed 1510 when the case unit is transferred into the payload area of the frame 110F (FIG. 11, Block 1103). For example, after the fingers are retracted and the case unit is positioned over the payload bed 1510 the fingers 1540 may be lowered so that the pickface 1700P is supported by, for example, the rollers 1510R (or any other suitable supports) of the payload bed 1510. The bot 110 may drive the rollers 1510R, as described above for determining the length L of the pickface, such that the pickface 1700P is located in substantial contact with a side 1510S1, 1510S2 of the payload bed 1510. When the pickface 1700P is in substantial contact with a side 1510S1, 1510S2, the bot controller 1220 may detect a signal from one of the sensors 1713A, 1713B and instruct the drive 1532 to stop driving the rollers 1510R after a predetermined time period as described above so that all case units 1700 of the pickface are in substantial contact with the side 1510S1, 1510S2. As may be realized movement of the pickface in the direction of arrow 1551 (e.g. in the direction of the longitudinal axis 6000 of the bot 110) registers a position of or locates pickface 1700P relative to the bot 110 along one axis (e.g. the longitudinal axis of the bot).

The bot 110 may also be configured to register the pickface 1700P along a second axis (e.g. the lateral axis of the bot) so that the lateral and longitudinal position of the pickface 1700P relative to the bot 110 is known. For example, a second datum reference may be formed by, for example, the fence 1510F. It is noted that the second reference datum, as well as the first reference datum, may be formed by any suitable features of the payload bed 1510. In the embodiments, the case unit contact member 1530 may be operated through any suitable drive, such as drive 1531, to move the case unit contact member 1530 towards the side opening 1510P of the payload bed 1510 for contacting and pushing the pickface 1700P substantially against the fence 1510F for locating the pickface 1700P laterally relative to the bot 110. The bot may have any suitable sensors 1714, which may be substantially similar to sensors 1713, for detecting the substantial contact between the pickface and the fence 1510F. It is noted that the bot controller 1220 may be configured to monitor strain (e.g. an increase in current, etc.) on the drive 1531 for detecting substantial contact between the pickface 1700P and the fence 1510F. As may be realized the sensors 1714 may be positioned at any suitable location relative to the payload bed 1510 for detecting the substantial contact between the pickface 1700P and the fence 1510F. As may also be realized, both drives 1531, 1532 may operate substantially simultaneously or independently of each other for moving the pickface in the directions of arrows 1550, 1551 for substantially contacting the first and second references datums (e.g. one of the sides 1510S1, 1510S2 and the fence 1510F). In this manner, as the pickface is in substantial contact with first and second reference datums (which may be substantially perpendicular to each other) the pickface 1700P is repeatably positioned at a predetermined location on the payload bed 1510.

The case unit contact member 1530 may remain in substantial contact with the pickface 1700P and work in conjunction with the fence 1510F (as shown in e.g. FIG. 10) for actively gripping the pickface 1700P between the case unit contact member 1530 and fence 1510F during transport of the pickface on the bot 110 (FIG. 11, Block 1104). To grip the pickface 1700P the bot 110 may move the case unit contact member a distance dependent on the depth D of the pickface 1700P so that the case unit contact member effects gripping of the pickface between the case unit contact member and the fence. In this manner gripping the pickface 1700P allows the position of the pickface 1700P relative to the bot 110 to be substantially maintained during transport of the pickface 1700P as well as prevent the pickface from escaping or falling off of the payload bed 1510 during transport. It is noted that the pickface may be actively gripped by the bot 110 during transport of the pickface in any suitable manner.

The bot 110 may be instructed by the control server 120 to transport the pickface 1700P located on the payload bed 1510 to a predetermined location (e.g. destination) within the storage and retrieval system 100. At the predetermined destination the case unit contact member 1530 may be moved to release the grip on the pickface 1700P. In the embodiments the bot controller 1220 may cause the drive 1532 to move the rollers 1510R so that the pickface 1700P is moved in the direction of arrow 1551 a predetermined distance away from the first reference datum (e.g. one of sides 1510S1, 1510S2) so the pickface 1700P can be lifted off of the payload bed 1510 and transferred off of the bot without substantial contact with the sides of the payload bed 1510 (e.g. unimpaired travel of the pickface 1700P from the payload bed). The bot controller 1220 may be configured to receive signals from, for example, sensors 1713 or obtain any other suitable information (such as from encoders on the drive 1532) for determining a distance between the pickface 1700P and the side 1510S1, 1510S2. When the determined distance is substantially equal to, for example, a predetermined distance (e.g. stored in a memory of the bot or control server 120) the bot controller 1220 may cause the drive 1532 to stop movement of the pickface 1700P. The bot 110 may also cause the case unit contact member to push the pickface 1700P against the fence 1510F after the pickface 1700P is moved away from the side 1510S1, 1510S2 so that the pickface 1700P is re-justified against the fence and all case units in the pickface are in substantial contact with one another. The re-justification and compacting (e.g. moving the case units together) of the pickface may be monitored in any suitable manner such as with any suitable sensors (such as those described above) and/or monitoring a condition of one or more of the bot drive motors such as the motors 1531, 1532. As the distance between the pickface 1700P and side 1510S1, 1510S2 is tracked by the controller 1220 and the pickface 1700P is re-justified against the fence 1510F the relative position between the pickface 1700P and the bot may be maintained as having a known relationship allowing the bot to place the pickface 1700P on, for example, a storage shelf 600 in a predetermined location. The predetermined location of the pickface and each of the case units therein may be stored in any suitable location such as, for example, in a memory of control server 120 for use when picking pickfaces from their respective locations on the storage shelves.

The bot controller 1220 causes the fingers 1540 to lift the pickface 1700P off of the rollers 1510R and above the stopping members 1510FM of the fence 1510F and extend laterally away from the bot 110 for placing the pickface 1700P at a desired location. When the pickface 1700P is located above its destination location, on for example, the storage shelf 600, the fingers 1540 are lowered between the stopping members 1510FM of the fence (e.g. into the slots 1510FS) and the pickface 1700P is transferred onto, for example, the support surface 620H1, 620H2 of the slatted storage shelf 600 for placing the pickface 1700P on the shelf 600 (FIG. 11, Block 1105).

In a first aspect of the disclosed embodiments, an autonomous transport robot for transporting a payload is provided. The autonomous transport robot includes a payload bed having at least one reference datum surface and at least one payload justification device, the at least one payload justification device being configured to position a payload on the payload bed in substantial contact with the at least one reference datum surface to place the payload in a predetermined position on the payload bed.

In accordance with the first aspect of the disclosed embodiments, the at least one reference datum surface includes a first and second reference datum surfaces disposed substantially perpendicular to one another and one of the first and second reference datum surfaces is substantially parallel with a longitudinal axis of the autonomous transport robot.

In accordance with the first aspect of the disclosed embodiments, the at least one justification device includes a first justification device configured to move the payload in a first direction to substantially contact the first reference datum surface and a second justification device configured to move the payload in a second direction, substantially perpendicular to the first direction, to contact the second reference datum surface.

In accordance with the first aspect of the disclosed embodiments, the first justification device includes driven rollers that form a payload support surface of the payload bed.

In accordance with the first aspect of the disclosed embodiments, the second justification device includes a driven pusher bar.

In accordance with the first aspect of the disclosed embodiments, the autonomous transport robot includes at least one sensor for detecting the substantial contact between the payload and at least one of the first and second reference datum surfaces.

In accordance with the first aspect of the disclosed embodiments, the first justification device is configured to move the payload a predetermined distance away from a respective one of the reference datum surfaces when the payload is transferred off of the payload bed and the second justification device is configured to re-justify the payload against the second reference datum surface.

In accordance with the first aspect of the disclosed embodiments, the autonomous transport robot includes a retaining fence disposed at an opening of the payload bed, the autonomous transport robot further including a driven pusher bar movably disposed at least party above the payload bed, the retaining fence and the driven pusher bar being configured to actively grip the payload during transport of the payload on the autonomous transport robot.

In accordance with the first aspect of the disclosed embodiments, the autonomous transport robot further comprises at least one sensor for detecting at least one dimension of the payload.

In accordance with a first sub-aspect of the first aspect of the disclosed embodiments, the autonomous transport robot further includes a retractable effector for transferring the payload between a payload holding area and the payload bed, the payload bed including guide surfaces configured to guide the payload into an area of the payload bed during transfer of the payload onto the autonomous transport robot.

In accordance with the first sub-aspect of the first aspect of the disclosed embodiments, the effector is configured to be raised from below the payload bed to a position at least partially above a retaining fence disposed at an opening of the payload bed, the retaining fence extending above the payload bed and being configured to at least in part retain the payload on the payload bed.

In accordance with a second aspect of the disclosed embodiments, an autonomous transport robot for transporting a payload within a storage and retrieval system is provided. The autonomous transport robot includes a payload bed having an opening, an effector for transferring the payload to and from the payload bed at least party through the opening, at least one sensor disposed adjacent the opening for sensing a first and second edge of the payload and a controller configured to determine a dimension of the payload based at least in part on the sensing of the first and second edge of the payload and to compare the determined dimension of the payload with a predetermined dimension of the payload.

In accordance with a first sub-aspect of the second aspect of the disclosed embodiments, the controller is configured generate a fault signal if the detected dimension and the predetermined dimension do not substantially match.

In accordance with the first sub-aspect of the second aspect of the disclosed embodiments, the controller is further configured to cause the effector to return the payload to a payload holding area from which it came if the detected dimension and the predetermined dimension do not substantially match.

In accordance with the first sub-aspect of the second aspect of the disclosed embodiments, the controller is further configured to verify a position of the autonomous transport robot within the storage and retrieval system if the detected dimension and the predetermined dimension do not substantially match.

In accordance with a second sub-aspect of the second aspect of the disclosed embodiments, the at least one sensor comprises at least one sensor for detecting other edges of the payload substantially transverse to the first and second edges and the controller is configured to determine another dimension of the payload that is substantially transverse to the dimension based at least in part on the detection of the other edges.

In accordance with the second sub-aspect of the second aspect of the disclosed embodiments, the autonomous transport robot further comprises a payload justification device for moving the payload in a direction on the payload bed substantially transverse to a direction of loading of the payload onto the payload bed, the payload justification device being configured to at least in part facilitate the detection of the another dimension.

It should be understood that the exemplary embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method for transporting a payload, the method comprising:
providing an autonomous transport robot having a payload bed, the payload bed having at least one reference datum surface with respect to a payload storage location;
providing the autonomous transport robot with at least one payload justification device; and
positioning, with the at least one payload justification device, a payload on the payload bed in substantial contact with the at least one reference datum surface that is arranged to move relative the payload bed to place each payload so that a payload side is at a variably selectable repeatable predetermined longitudinal position, independent of a payload size, on the payload bed relative to at least a longitudinal axis of the autonomous transport robot.

2. The method of claim 1, wherein selecting a variance on the variably selectable repeatable predetermined longitudinal position effects fine adjustment for payload rise with respect to a final support rack storage location of the payload.

3. The method of claim 1, wherein the at least one reference datum surface includes a first and second reference datum surfaces disposed substantially perpendicular to one another and one of the first and second reference datum surfaces is substantially parallel with the longitudinal axis of the autonomous transport robot.

4. The method of claim 3, wherein the at least one payload justification device includes a first justification device and a second justification device, the method further comprising moving, with the first justification device, the payload in a first direction to substantially contact the first reference datum surface, and moving, with the second justification device, the payload in a second direction, substantially perpendicular to the first direction, to contact the second reference datum surface.

5. The method of claim 4, wherein the first justification device includes driven rollers that form a payload support surface of the payload bed.

6. The method of claim 4, wherein the second justification device includes a driven pusher bar.

7. The method of claim 3, further comprising detecting, with at least one sensor of the autonomous transport robot, the substantial contact between the payload and at least one of the first and second reference datum surfaces.

8. The method of claim 1, wherein the autonomous transport robot includes a retaining fence disposed at an opening of the payload bed and a driven pusher bar movably disposed at least partly above the payload bed, the method further comprising actively gripping, with the retaining fence and the driven pusher bar, the payload during transport of the payload on the autonomous transport robot.

9. The method of claim 1, further comprising detecting, with at least one sensor of the autonomous transport robot, at least one dimension of the payload.

10. The method of claim 1, further comprising:
transferring the payload between a payload holding area and the payload bed with a retractable effector of the autonomous transport robot; and
guiding, with guide surfaces of the payload bed, the payload into an area of the payload bed during transfer of the payload onto the autonomous transport robot.

11. The method of claim 9, further comprising:
raising the retractable effector from below the payload bed to a position at least partially above a retaining fence disposed at an opening of the payload bed; and
retaining, at least in part, with the retaining fence extending above the payload bed, the payload on the payload bed.

12. A method for transporting a payload, the method comprising:
providing an autonomous transport robot having a payload bed, the payload bed having at least one reference datum surface with respect to a payload storage location;
providing the autonomous transport robot with at least one payload justification device; and
positioning, with the at least one payload justification device, a payload on the payload bed in substantial contact with the at least one reference datum surface that is arranged to move relative the payload bed to place each payload so that a payload side is at a variably selectable repeatable predetermined longitudinal position, independent of a payload size, on the payload bed relative to at least a longitudinal axis of the autonomous transport robot;
wherein the at least one reference datum surface includes a first and second reference datum surfaces disposed substantially perpendicular to one another and one of the first and second reference datum surfaces is substantially parallel with the longitudinal axis of the autonomous transport robot, and
wherein the payload bed effects, raising the payload from the payload bed and placing the payload on a support rack in a rack position with respect to a rack direction determined by the variably selectable repeatable predetermined longitudinal position on the payload bed set by the first reference datum surface.

13. The method of claim 12, wherein the payload bed effects, raising the payload from the payload bed and placing the payload on the support rack in the rack position with respect to another rack direction determined by the second reference datum surface so that the payload is placed in the rack position as determined by the second reference datum surface.

14. The method of claim 12, wherein selecting a variance on the variably selectable repeatable predetermined longitudinal position effects fine adjustment for payload rise with respect to a final support rack storage location of the payload.

15. The method of claim 12, wherein the autonomous transport robot includes a retaining fence disposed at an opening of the payload bed and a driven pusher bar movably disposed at least partly above the payload bed, the method further comprising actively gripping, with the retaining fence and the driven pusher bar, the payload during transport of the payload on the autonomous transport robot.

16. The method of claim 12, further comprising detecting, with at least one sensor of the autonomous transport robot, at least one dimension of the payload.

17. The method of claim 12, further comprising:
transferring the payload between a payload holding area and the payload bed with a retractable effector of the autonomous transport robot; and
guiding, with guide surfaces of the payload bed, the payload into an area of the payload bed during transfer of the payload onto the autonomous transport robot.

18. The method of claim 17, further comprising:
raising the retractable effector from below the payload bed to a position at least partially above a retaining fence disposed at an opening of the payload bed; and
retaining, at least in part, with the retaining fence extending above the payload bed, the payload on the payload bed.

19. The method of claim 12, wherein the at least one payload justification device includes a first justification device and a second justification device, the method further comprising moving, with the first justification device, the payload in a first direction to substantially contact the first reference datum surface, and moving, with the second justification device, the payload in a second direction, substantially perpendicular to the first direction, to contact the second reference datum surface.

20. The method of claim 19, wherein the first justification device includes driven rollers that form a payload support surface of the payload bed.

21. The method of claim 19, wherein the second justification device includes a driven pusher bar.

22. The method of claim 12, further comprising detecting, with at least one sensor of the autonomous transport robot, the substantial contact between the payload and at least one of the first and second reference datum surfaces.

* * * * *